(12) United States Patent
Perazzo et al.

(10) Patent No.: US 7,591,367 B2
(45) Date of Patent: Sep. 22, 2009

(54) CONTAINER UNSCRAMBLER SYSTEM HAVING ADJUSTABLE TRACK

(75) Inventors: Nicholas J. Perazzo, Sarasota, FL (US); David P. Pletz, Bradenton, FL (US); Michael A. Ruth, Oldsmar, FL (US)

(73) Assignee: New England Machinery, Inc., Bradenton, FL (US)

( * ) Notice: Subject to any disclaimer, the term of this patent is extended or adjusted under 35 U.S.C. 154(b) by 0 days.

(21) Appl. No.: 11/833,412

(22) Filed: Aug. 3, 2007

(65) Prior Publication Data

US 2007/0289841 A1 Dec. 20, 2007

Related U.S. Application Data

(62) Division of application No. 10/982,563, filed on Nov. 5, 2004, now Pat. No. 7,270,229.

(51) Int. Cl.
*B65G 27/00* (2006.01)
(52) U.S. Cl. .................. 198/550.2; 198/550.01; 198/550.4
(58) Field of Classification Search .......... 198/391, 198/396, 397.05, 533, 550.01, 550.2, 550.4, 198/756, 757, 836.4, 861.1
See application file for complete search history.

(56) References Cited

U.S. PATENT DOCUMENTS

| | | | |
|---|---|---|---|
| 1,720,680 A | 7/1929 | Kleineberg | |
| 3,295,659 A | 1/1967 | Aidlin | |
| 3,650,368 A | 3/1972 | Nalbach | |
| 3,858,711 A | 1/1975 | Barker | |
| 4,011,962 A | 3/1977 | Favell | |
| 4,039,074 A | 8/1977 | Maxted | |
| 4,095,688 A | 6/1978 | Ionescu | |
| 4,148,390 A | 4/1979 | Ionescu | |
| 4,257,516 A | 3/1981 | Ionescu | |
| 4,271,954 A | 6/1981 | Gosney | |
| 4,328,887 A | 5/1982 | Beard et al. | |
| 4,331,227 A | 5/1982 | Risley | |
| 4,369,643 A | 1/1983 | Cianciolo et al. | |
| RE31,293 E | 6/1983 | Amberg et al. | |
| 4,441,955 A | 4/1984 | Richardson et al. | |
| 4,463,846 A | 8/1984 | Ionescu | |
| 4,556,445 A | 12/1985 | McCormick | |
| 4,593,805 A | 6/1986 | Huddle | |
| 4,621,745 A | 11/1986 | Grace | |
| 4,630,725 A | 12/1986 | Steurmer | |
| 4,642,975 A | 2/1987 | Langen et al. | |
| 4,655,338 A | 4/1987 | Hershey et al. | |
| 4,696,144 A | 9/1987 | Bankuty et al. | |
| 4,730,730 A | 3/1988 | Clarkson | |
| 4,782,939 A | 11/1988 | Fields | |
| 4,789,055 A | 12/1988 | Steurmer | |
| 4,825,995 A | 5/1989 | Nalbach | |
| 4,865,181 A | 9/1989 | Nalbach | |
| 4,928,808 A | 5/1990 | Marti | |

(Continued)

*Primary Examiner*—Douglas A Hess
(74) *Attorney, Agent, or Firm*—Jacox, Meckstroth & Jenkins

(57) ABSTRACT

A container feeding system is shown having an unscrambler having an unscrambler bowl providing a track or channel that is adjustable such that it can accommodate bottles of varying sizes. The system comprises an adjustable chute that is also adjustable and having a chute channel or track that is also adjustable to accommodate containers of varying sizes when the containers are conveyed from the unscrambling bowl, through the adjustable chute, and to a subsequent processing station.

34 Claims, 15 Drawing Sheets

U.S. PATENT DOCUMENTS

| | | | |
|---|---|---|---|
| 4,979,607 A | 12/1990 | Fogg | |
| 5,065,852 A | 11/1991 | Marti | |
| 5,201,398 A | 4/1993 | Clugston | |
| 5,244,082 A | 9/1993 | Togashi | |
| 5,291,988 A | 3/1994 | Leonard | |
| 5,348,061 A | 9/1994 | Riley et al. | |
| 5,358,091 A | 10/1994 | Herzog | |
| 5,421,447 A | 6/1995 | Ruth et al. | |
| 5,421,678 A | 6/1995 | Aidlin et al. | |
| 5,510,621 A | 4/1996 | Goldman | |
| 5,515,668 A | 5/1996 | Hunt et al. | |
| 5,614,718 A | 3/1997 | Brace | |
| 5,750,998 A | 5/1998 | Goldman | |
| 5,769,203 A | 6/1998 | Marti Sala | |
| 5,975,278 A | 11/1999 | Ruth | |
| 6,206,171 B1 | 3/2001 | Crawford | |
| 6,209,591 B1 | 4/2001 | Taggart | |
| 6,256,967 B1 | 7/2001 | Hebron et al. | |
| 6,257,392 B1 | 7/2001 | Graham | |
| 6,261,030 B1 | 7/2001 | Rassman, Jr. et al. | |
| 6,279,722 B1 | 8/2001 | Bankuty et al. | |
| 6,302,258 B1 | 10/2001 | Verona | |
| 6,308,816 B1 | 10/2001 | Bankuty et al. | |
| 6,317,648 B1 | 11/2001 | Sleep et al. | |
| 6,363,687 B1 | 4/2002 | Luciano et al. | |
| 6,378,695 B1 | 4/2002 | Rinne | |
| 6,382,880 B2 | 5/2002 | Rassman, Jr. et al. | |
| 6,390,736 B2 | 5/2002 | Rassman, Jr. et al. | |
| 6,435,333 B1 | 8/2002 | Sala | |
| 6,449,927 B2 | 9/2002 | Hebron et al. | |
| 6,475,435 B1 | 11/2002 | Taggart | |
| 6,481,468 B1 | 11/2002 | Taggart | |
| 6,502,688 B1 | 1/2003 | Krooss et al. | |
| 6,522,945 B2 | 2/2003 | Sleep et al. | |
| 6,523,328 B1 | 2/2003 | De Cardenas et al. | |
| 6,536,188 B1 | 3/2003 | Taggart | |
| 6,702,985 B1 | 3/2004 | Taggart et al. | |
| 6,715,266 B2 | 4/2004 | Browning | |
| 6,729,836 B2 | 5/2004 | Stingel, III et al. | |
| 6,742,671 B2 | 6/2004 | Hebron et al. | |
| 6,745,103 B1 | 6/2004 | McKillop et al. | |
| 6,758,323 B2 | 7/2004 | Costanzo | |
| 6,820,396 B2 | 11/2004 | Wallis | |
| 6,966,422 B2 * | 11/2005 | Lanfranchi | 198/396 |
| 6,991,085 B2 * | 1/2006 | Lanfranchi | 198/396 |
| 7,134,540 B1 * | 11/2006 | Marti Sala | 198/392 |
| 7,219,794 B2 * | 5/2007 | Perazzo et al. | 198/861.1 |
| 7,246,701 B2 * | 7/2007 | Lanfranchi | 198/860.1 |
| 7,270,229 B2 * | 9/2007 | Perazzo et al. | 198/550.4 |

* cited by examiner

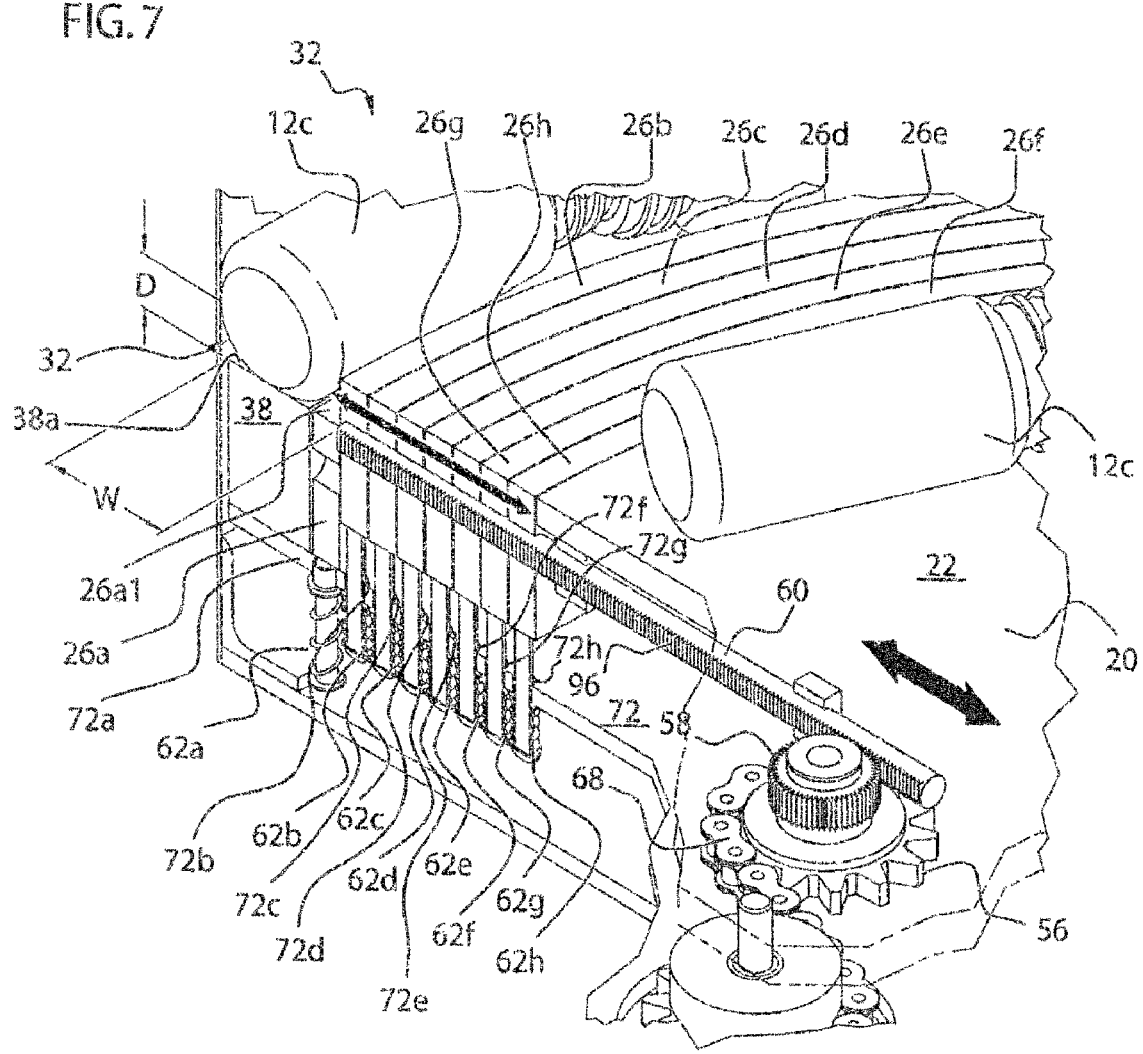

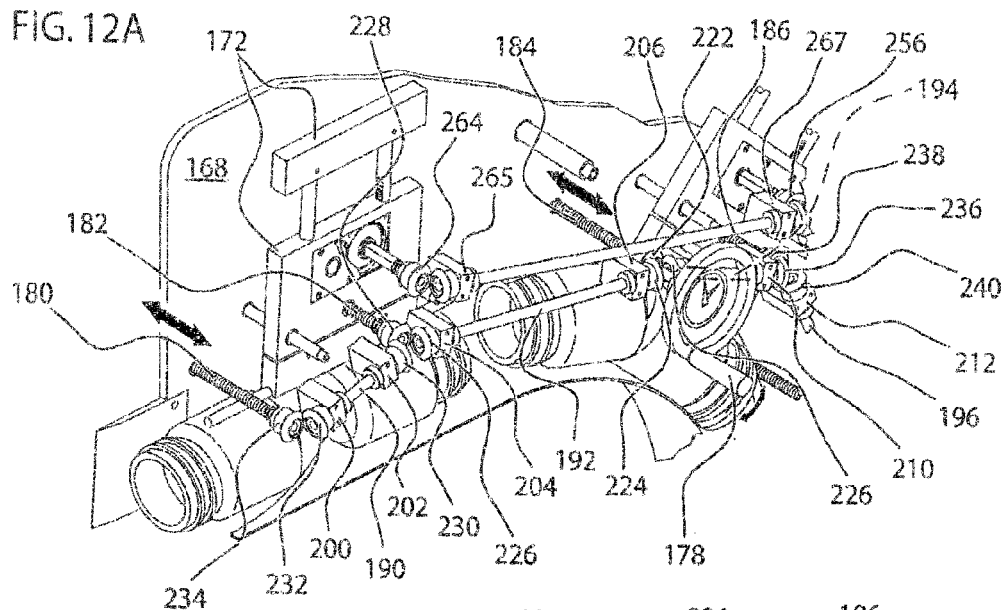
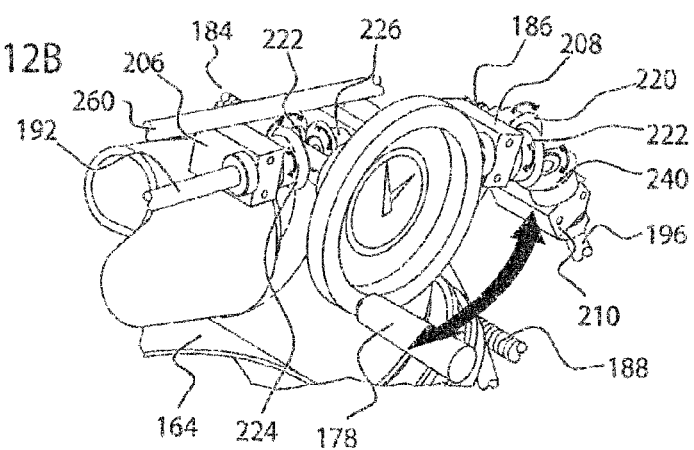
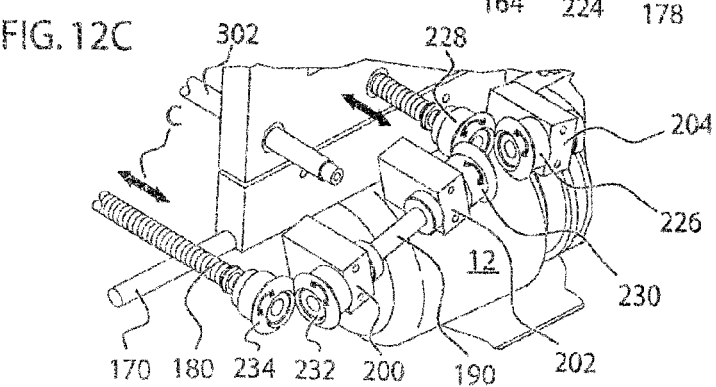

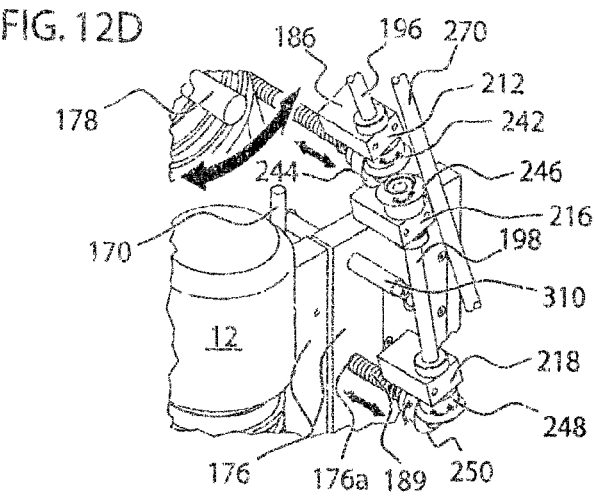
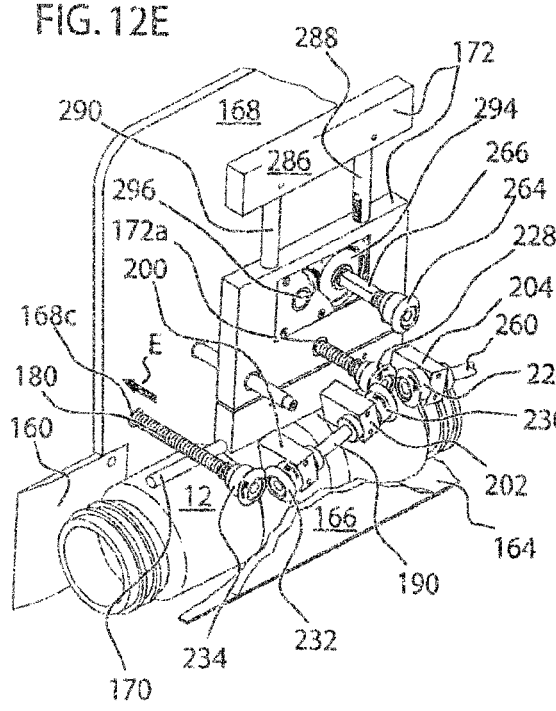
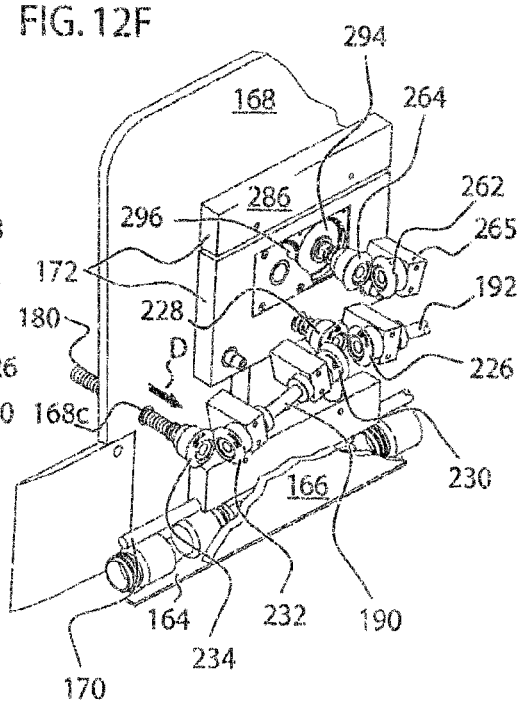

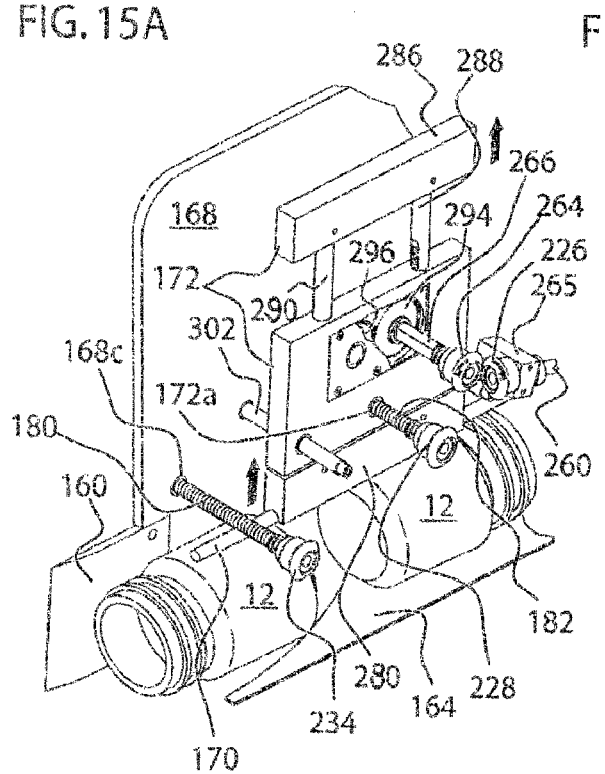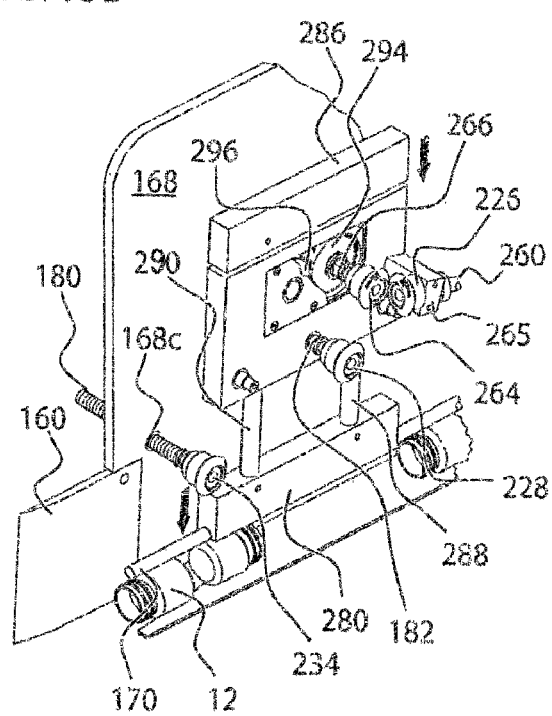

CONTAINER UNSCRAMBLER SYSTEM HAVING ADJUSTABLE TRACK

RELATED APPLICATION

This application is a divisional of application Ser. No. 10/982,563, filed Nov. 5, 2004 now U.S. Pat. No. 7,270,229, which is incorporated herein by reference and made a part thereof.

BACKGROUND OF THE INVENTION

The invention relates generally to the field of packaging and particularly to a system and method for unscrambling and conveying containers using an unscrambler and chute, both of which have an adjustable channel.

Apparatuses for unscrambling and orienting various articles such as containers in the form of bottles and cans, etc. are well known. For example, unscrambling apparatuses having a fixed track size for unscrambling and positioning bottles and cans are described in U.S. Pat. Nos. 3,295,659; 3,650,368; 4,095,688; 4,148,390; 4,257,516; 4,271,954; 4,463,846; 4,782,939; 4,865,181; 4,928,808; 4,979,607; 5,348,061; 5,358,091; 6,279,722; 6,308,816; 6,502,688 and 6,758,323.

Typically, a plurality of containers to be filled, such as bottles, cans, jars, and the like, having the same size and shape are fed to an unscrambling device where they are unscrambled. For example, in the prior art system, unscrambled containers are fed through a chute having a fixed channel size to an indexing table where they are oriented so that the open ends of all the bottles or cans face in an upward direction and the closed ends face the opposite direction. The bottles or cans thus oriented are transported to a loading station where they are filled with a substance such as pharmaceutical medications, such as aspirin, lotions, ointments, fragrances, foods, drinks, etc. The filled bottles or cans are then capped, labeled and prepared for shipping to the appropriate destination.

Pharmaceutical companies, cosmetic manufacturers and other manufacturers, every year, sell millions of bottles and other sealable containers containing their various products. In order to be competitive in today's market, manufacturers must offer their products in various size containers. For example, almost all over-the-counter pharmaceutical substances such as aspirin, etc. are now sold in various size containers holding from a few tablets to 500 more tablets, depending on the needs and desires of the consumer.

The use of a large number of varying-sized containers to package products poses a particular problem to the manufacturing and packaging industries because they oftentimes used an unscrambler having a fixed track size. The unscrambler fed the bottles to a chute that had a channel that was also fixed. Thus, in order to change from one size container to another, for example, the various machinery, tooling, parts (such as guide arms, unscrambler bowl or entire chute) had to be "changed out" before the machinery could accommodate another size. This change over not only results in additional costs because of the parts and extra man hours needed to convert the machinery, but also results in lost revenue due to the down time.

Accordingly, there is a need in the industry for new machinery and improved system and methods which overcome one or more of these problems.

SUMMARY OF THE INVENTION

A primary object of the present invention is to provide an improved system for use in the packaging industry to unscramble, orient and convey empty containers, such as bottles and cans which are to be automatically filled with specific products.

It is another object of the invention to provide a novel unscrambler having a track or channel size that can be easily and quickly adjusted so the unscrambler can unscramble containers of one size to being able to unscramble containers of another size.

It is yet another object of the invention to provide a novel and adjustable guide chute having a channel that can be adjusted so that it can easily and quickly accept containers of various sizes.

The unscrambler in one embodiment comprises an adjustable unscrambler having a rotatable circular horizontal floor and a circular wall perpendicular and adjacent to the circular edge of the horizontal floor creating a bowl shape. At the outer edge of the horizontal floor, there is positioned a plurality of individual ring members adjacent each other and extending around the floor of the unscrambler, such that each ring member from the outermost member to the innermost member, exhibits a circumference less than the adjacent outer member. Each of the ring members is capable of individual movement in a perpendicular direction with respect to the relatively horizontal orientation of the floor. The movement of ring members is not completely independent of all the other concentric rings as will be described later. The floor of the unscrambler is generally horizontal and is also slightly domed providing a gradually sloping convex floor surface so that when the empty containers are loaded into the unscrambler, the sloping convex surface of the domed floor causes the empty containers to gravitate toward the outer wall of unscrambler. Centrifugal force caused by the floor being rotated also urges the empty containers toward the outer wall of the unscrambler and assists in maintaining them near the outer wall. Although the sloping floor and centrifugal force causes the containers to gravitate to the outer wall of the unscrambler, the containers may end up in a totally undesirable random orientation. In order for the containers to move forward in orderly fashion toward a conveyer or chute, which transports the containers to another device in the packing process, all of the containers must be in some sort of alignment so that they will fittingly traverse the chute or conveyer without clogging the path.

According to another embodiment, the system comprises an adjustable chute, with the containers lying on their sides against the vertical wall of the unscrambler being held in place by a track defined by an appropriate number of concentric members that have been raised to a predetermined height. For example, larger containers require a larger distance between the inside surface of the vertical unscrambler and the outer circumference of the concentric member which will hold the container on the track. Therefore, one of the inner concentric members which is predetermined based upon the diameter of the container, would be raised to an appropriate height such that individual containers, one by one, would be transported to an entrance of a channel in an adjustable chute where each of the containers would be oriented to have the open end of the container in one direction and the closed end in the opposite direction. To prevent the container from being lodged between the outer circumferential wall of the unscrambler, one or more of the concentric ring members are raised vertically to a height which is less than the radius of the container and cooperate with a rim to define a track for receiving the containers.

In one aspect, this invention comprises an unscrambler comprising a floor comprising a central portion having a first side and a second side, the central portion being generally circular and comprising a first wall, a second wall spaced apart from the first wall and extending around at least a portion of the central portion, the second wall and the first wall cooperating to define a channel having a first predetermined dimension, a drive motor for rotatably driving the floor, the first wall of the central portion having a diameter that is variable in order to change the first predetermined dimension, and wherein the floor comprises a plurality of concentric rings situated about the central portion, each of the plurality of concentric rings being independently or simultaneously selectable to change the first predetermined dimension.

In another aspect, this invention comprises an unscrambler comprising a floor comprising a central portion having a first side and a second side, the central portion being generally circular and comprising a first wall, a second wall spaced apart from the first wall and extending around at least a portion of the central portion, the second wall and the first wall cooperating to define a channel having a first predetermined dimension, a drive motor for rotatably driving the floor, the first wall of the central portion having a diameter that is variable in order to change the first predetermined dimension, wherein the floor comprises a plurality of concentric rings situated about the central portion, at least one of the plurality of concentric rings defining the second wall, and wherein each of the plurality of concentric rings comprises a plurality of apertures that are generally aligned when the plurality of concentric rings are situated in a home position, the unscrambler further comprising a plurality of slidable supports that are generally aligned with and capable of being driven into the plurality of apertures.

In still another aspect, this invention comprises an unscrambler comprising a floor comprising a central portion having a first side and a second side, the central portion being generally circular and comprising a first wall, a second wall spaced apart from the first wall and extending around at least a portion of the central portion, the second wall and the first wall cooperating to define a channel having a first predetermined dimension, a drive motor for rotatably driving the floor, the first wall of the central portion having a diameter that is variable in order to change the first predetermined dimension, wherein the floor comprises a plurality of concentric rings situated about the central portion, at least one of the plurality of concentric rings defining the second wall, wherein the unscrambler comprises a plurality of slidable supports associated with the second side for selecting one or more of the plurality of concentric rings, and wherein each of the plurality of slidable supports comprises a rack, the unscrambler further comprises a plurality of pinions operatively engaging the plurality of slidable supports, and a drive train coupled to the plurality of pinions for rotatably driving the plurality of pinions and driving the plurality of slidable supports in response thereto.

In yet another aspect, this invention comprises an unscrambler comprising a channel that is adjustable in size to accommodate containers of different sizes, the unscrambler comprising a central floor for defining at least a portion of a floor of the unscrambler, a plurality of concentric rings surrounding the central floor, a drive motor for rotatably driving the central floor and the plurality of concentric rings, an unscrambler wall surrounding the central floor and the plurality of concentric rings, and a ring drive assembly for selecting at least one of the plurality of concentric rings and also for moving it from a home position to an operating position, with a ring wall of the at least one of the plurality of concentric rings that is in the operating position and the unscrambler wall defining the channel for receiving a container to be processed.

In still another aspect, this invention comprises an unscrambler for unscrambling containers comprising a bowl having a bowl wall, a turret situated in the bowl, a drive system coupled to the turret for rotatably driving the turret, the drive system also being capable of driving the turret along an axis of rotation from a home position to an operating position, wherein the turret comprises a first planar member, a second member situated on the first planar member, an outer edge of the second member cooperating with the bowl wall to define a channel having a predetermined depth and width, and wherein the second member comprises a central portion and a plurality of concentric rings that are actuatable from the home position to the operating position.

In yet another aspect, this invention comprises an unscrambler for unscrambling containers comprising a bowl having a bowl wall, a turret situated in the bowl, a drive system coupled to the turret for rotatably driving the turret, the drive system also being capable of driving the turret along an axis of rotation from a home position to an operating position, and wherein the second member comprises a central portion and a plurality of concentric rings that are actuatable from the home position to the operating position to define a the channel adjacent the bowl wall.

In still another aspect, this invention comprises An unscrambler for unscrambling containers comprising a bowl having a bowl wall, a turret situated in the bowl, a drive system coupled to the turret for rotatably driving the turret, the drive system also being capable of driving the turret along an axis of rotation from a home position to an operating position, wherein the turret comprises a first planar member, a second member situated on the first planar member, an outer edge of the second member cooperating with the bowl wall to define a channel having a predetermined depth and width, and wherein the second member comprises a first portion and a second portion, at least a portion of the second portion remaining in the home position after the drive system drives the first portion to the operating position.

Other objects and advantages of the invention will be apparent from the following description, the accompanying drawings and the appended claims.

BRIEF DESCRIPTION OF THE DRAWINGS

FIG. 7 is a fragmentary sectional view showing further details of the unscrambler;

FIGS. 12A-12F are fragmentary views illustrating various components of the adjustable chute illustrated in FIGS. 9 and 10 and further illustrating details of the system and method for adjusting a width to opposing walls;

FIGS. 15A-15B are fragmentary views illustrating the movement of the tubular support to accommodate different container sizes.

DETAILED DESCRIPTION OF THE INVENTION

Figure 1:
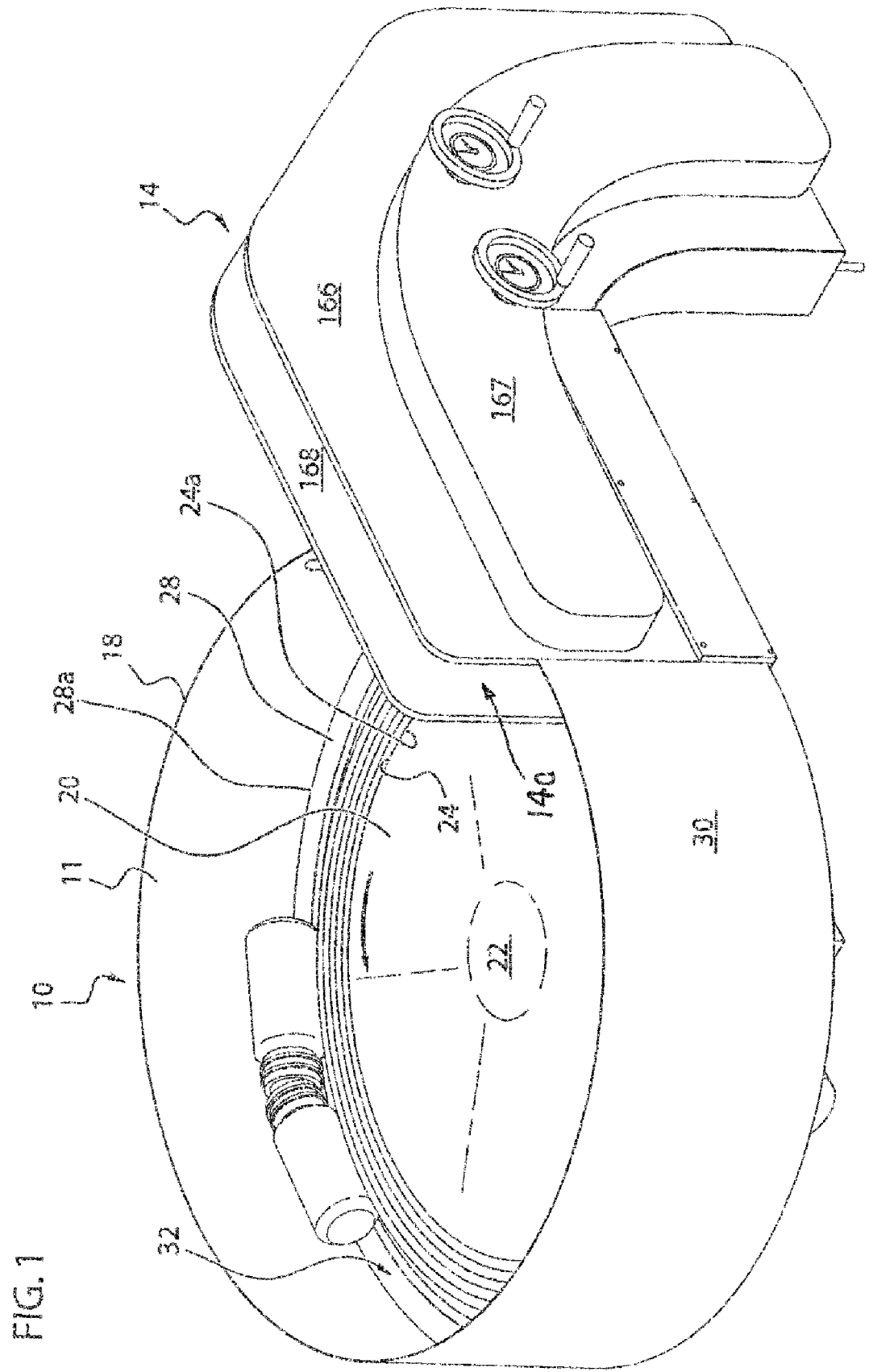
FIG. 1 is a perspective view of an adjustable unscrambler and adjustable guide chute.

Referring to the drawings, FIG. 1 illustrates an apparatus or system 10 having an unscrambler 11 for unscrambling a plurality of randomly oriented containers 12, such as bottles, jars and like. The unscrambler 11 provides an unscrambling bowl 18 that conveys the containers 12 to an adjustable chute 14. The containers 12 pass through the adjustable chute 14 to a subsequent station 17 where the containers 12 may be further processed, such as at an indexing station where the containers are oriented in an upright position for further processing.

The unscrambler 11 (FIGS. 2-4) is bowl-shaped and is illustrated as one component of the system 10 provides one embodiment of the present invention. The unscrambling bowl 18 includes a rotatable circular floor 20 (FIGS. 1 and 2) having a top surface that is domed or curved. The floor 20 comprises central section or portion 22 that is mounted on a bearing sleeve/collar 23 (FIG. 2) of the type previously known. The floor 20 further comprises a first rim 24 defining a first edge 24a of the dome center section 22, a plurality of rings or ring members 26a-26h, with ring member 26a being adjacent the first rim 24. A second outer rim 28 defines an outer edge 28a of the floor 20 and is adjacent a first wall or circular boundary wall 30 that extends substantially about the exterior boundary of the unscrambling bowl 18 and also extends upward from the rim 28 and floor 20 as shown.

The ring members 26a-26h are concentric and separately and independently movable between a raised or operative position and a lowered or home position, as more fully described later herein. Any raised ring members 26a-26h cooperate with wall 30, outer rim 28 and the top surface 26a1-26h1 (FIG. 8) of any ring members 26a-26h that are not raised, such as surface 26a1 (FIG. 7) of ring member 26, to provide or define a track or channel 32. The channel 32 provides a track by which containers 12 may be transported to the adjustable chute 14.

Figure 8:
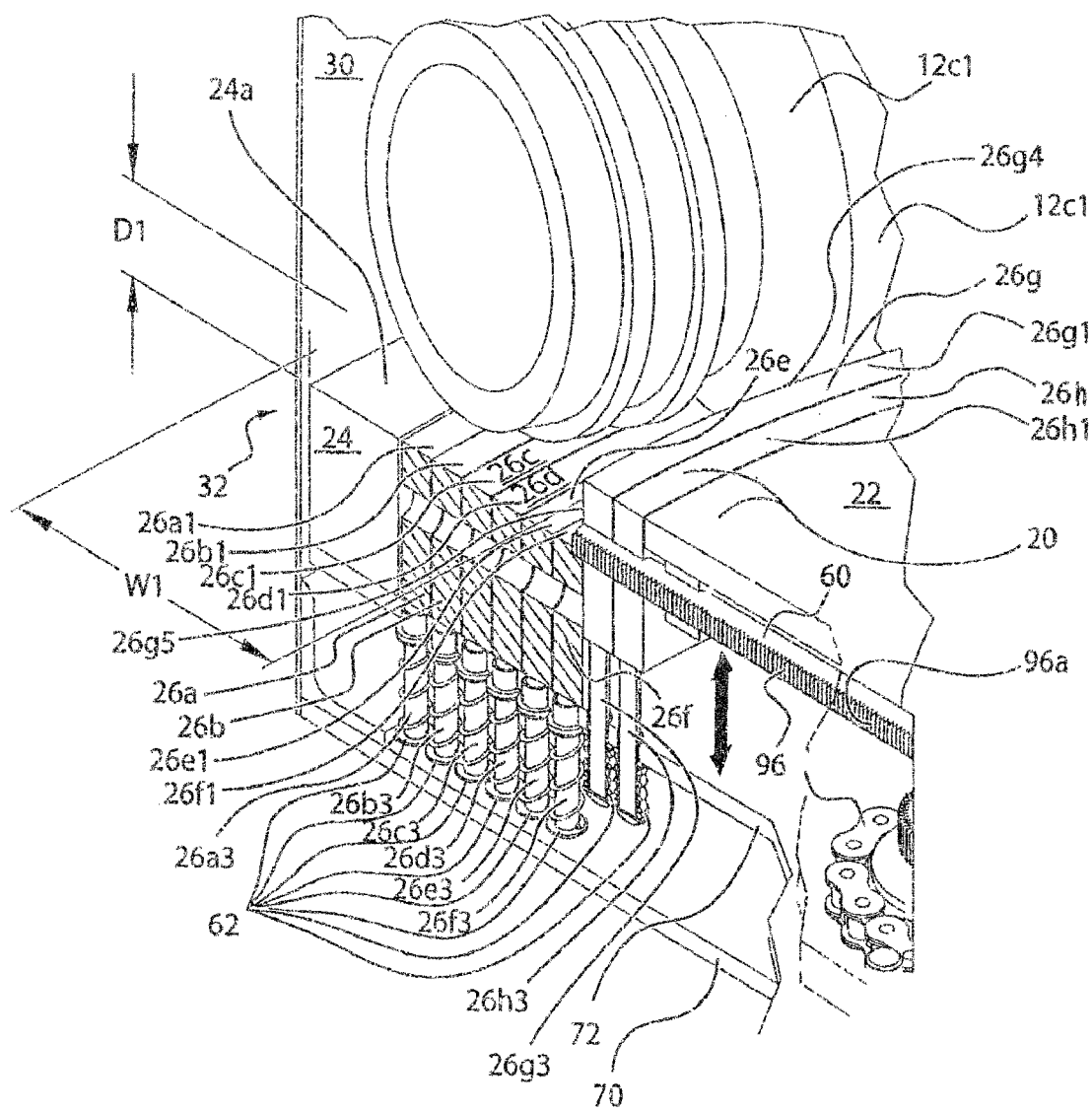
FIG. 8 is another fragmentary sectional view, similar to FIG. 7, showing further details of the unscrambler as it accommodates a relatively larger bottle size.

It should be understood that the size of channel 32 in the unscrambler 18 is adjustable and comprises or defines a width, such as width W and W1 in FIGS. 7 and 8, respectively, that is somewhat less than a diameter of the container 12 being processed in the example being described. Likewise, the channel 32 defines a depth, such as depth D and D1 in FIGS. 7 and 8, respectively, which is somewhat less than a radius of the container 12 being processed.

Figure 2:
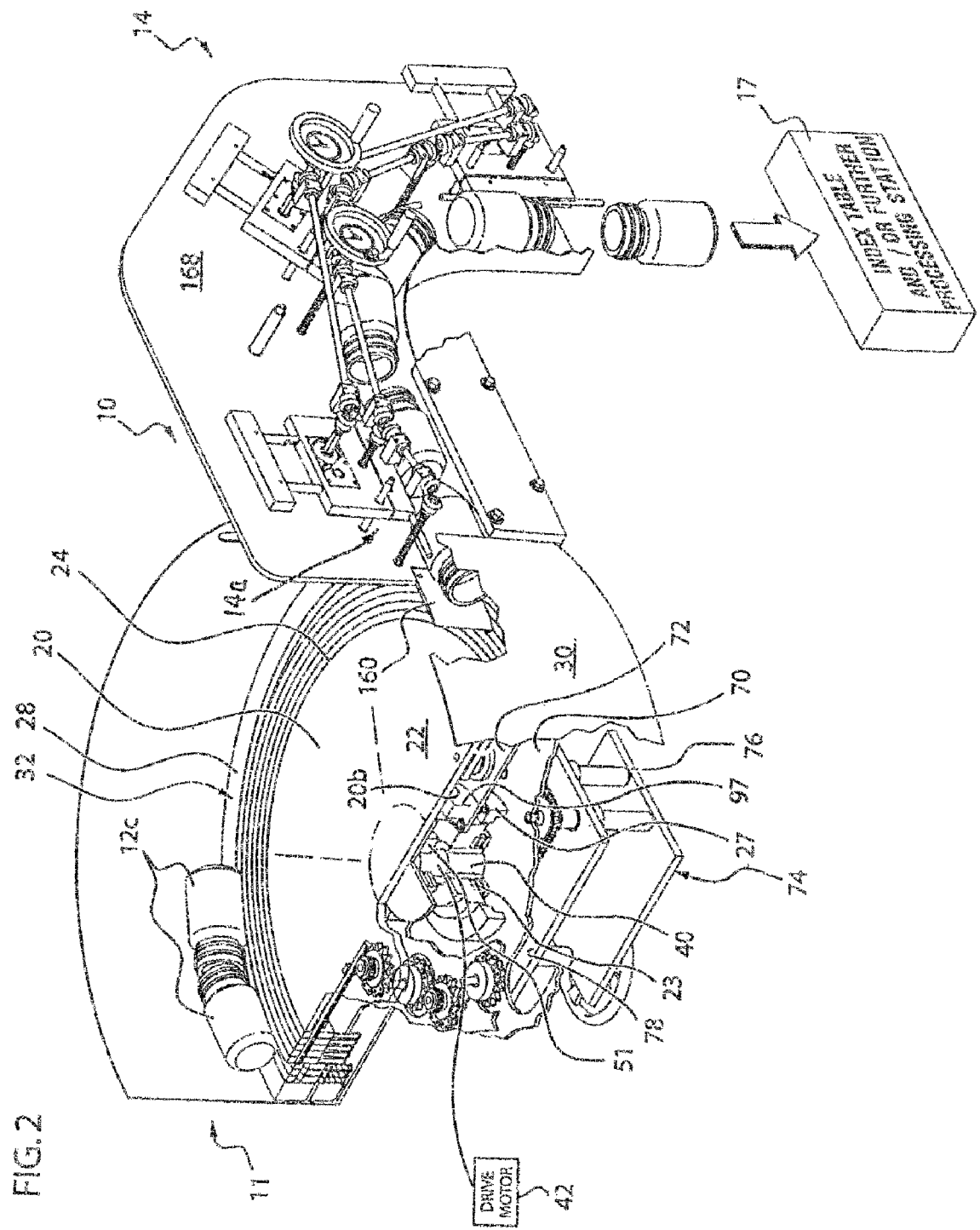
FIG. 2 is a fragmentary view of the adjustable guide chute and adjustable scrambler shown in FIG. 1.
Figure 3:
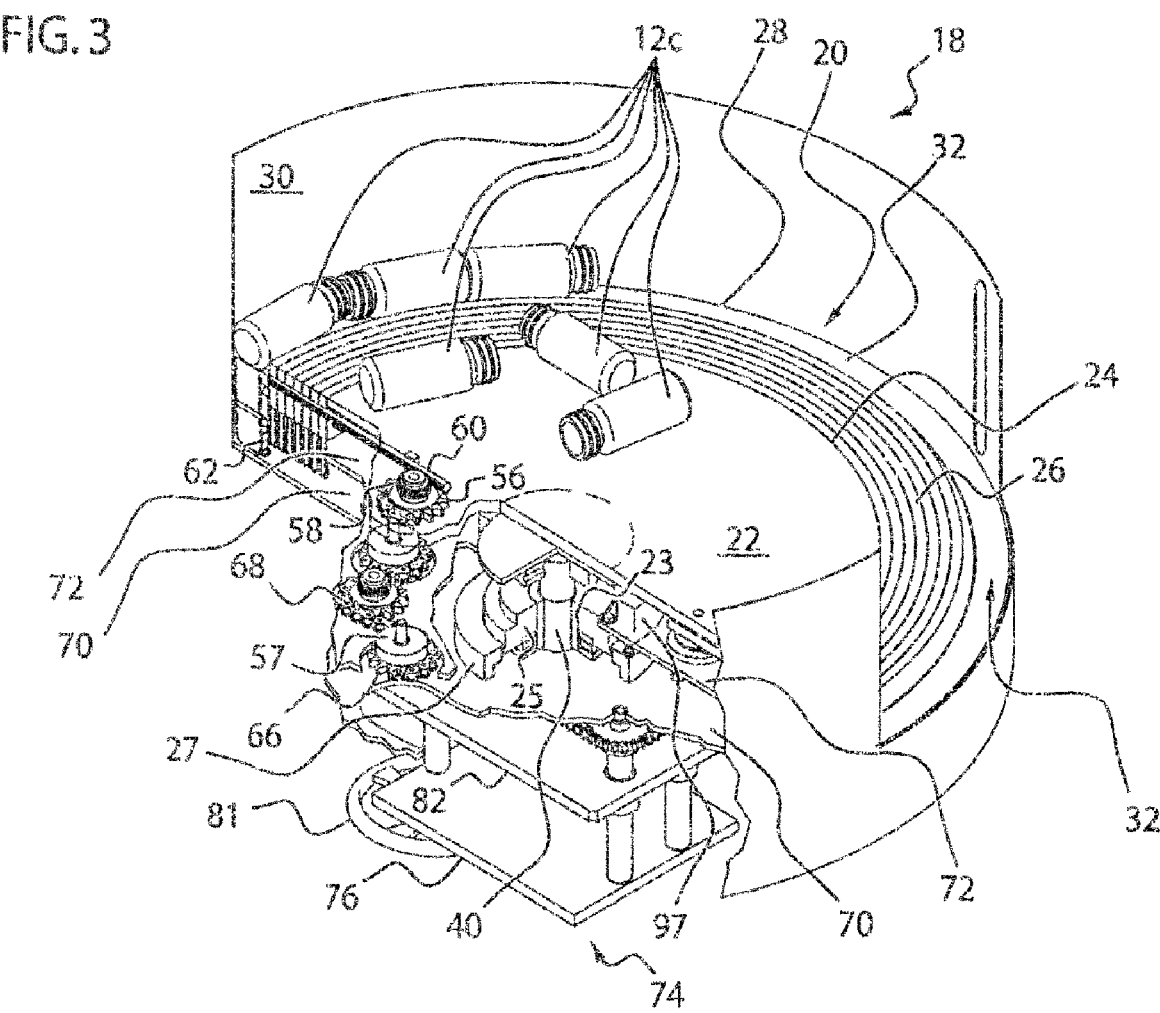
FIG. 3 is a fragmentary view of the adjustable unscrambler showing various details.

Details of the unscrambler 11 will now be described relative to FIGS. 2-8. FIG. 2 is another fragmentary view of the system 10, illustrating various details of the unscrambler 11 and adjustable chute 14. Notice in FIG. 2 that the unscrambler 11 comprises the floor 20 that lies in a generally horizontal first plane.

Figure 5:
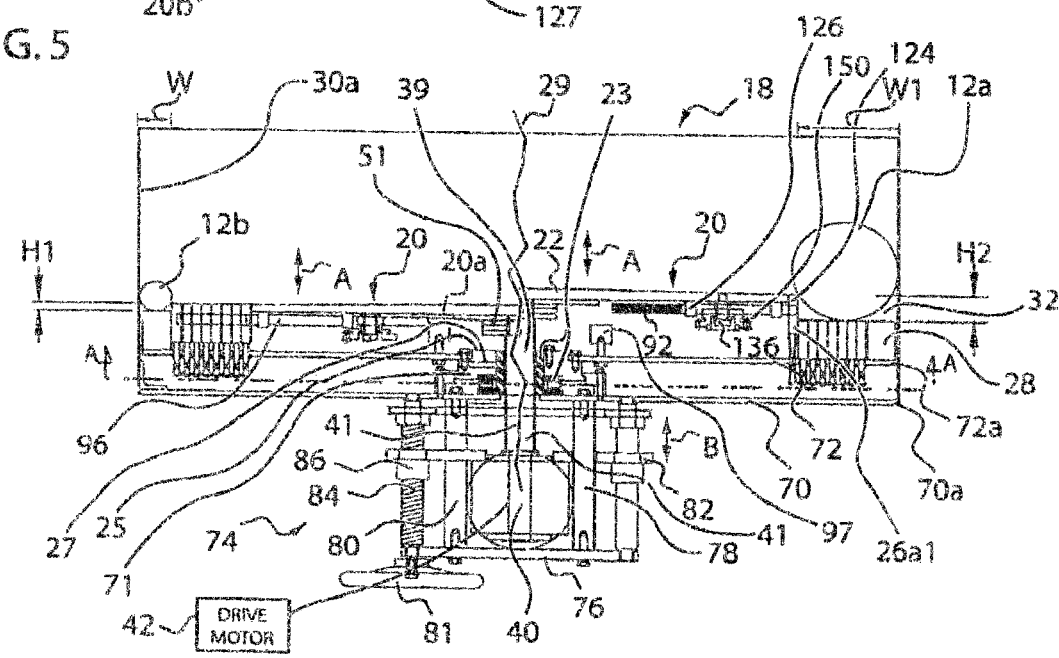
FIG. 5 is a sectional view of the unscrambler, showing a sectional comparison of the floor when it is in a first or home position (the leftmost portion of FIG. 5), illustrating a plurality of rings which urge a container against an unscrambler wall and a rightmost portion of FIG. 5 showing the floor when compared to the position of the floor as shown in the leftmost portion of FIG. 5, illustrating only a single raised ring member with the remaining ring members being biased to a home position, such that a channel between the raised ring member and the unscrambler wall is defined to receive a container that is larger than the container shown in the left position FIG. 5.

The unscrambler 11 comprises means or apparatus for raising or lowering the floor 20 one or more of the plurality of ring members 26a-26h to define the channel 32. In this regard, the unscrambler 11 comprises apparatus or means for adjusting or changing a diameter of the central portion 22, for selecting and actuating selected ones of the plurality of rings 26a-26h, and for driving the domed center portion 22 and the selected rings 26a-26h between the lowered or home position (illustrated by the position of ring member 26a in FIG. 7) and the raised or operating position (illustrated by the positions of ring members 26b-26h in FIG. 7) where the walls of selected rings become generally perpendicular to a plane of floor 20. It should be understood that the number of rings 26a-26h selected to be raised is in response the diameter of the container 12 being processed. In general, an operator determines the number of ring members 26a-26h to be raised to define the channel 32 while the floor 20 is in the lowered or home position, which is when all top surfaces 26a1-26h1 are generally coplanar with surface 38a of rim 38, as shown in the left position of FIG. 5. After such determination, the operator actuates a plurality of supports or racks 92-102 described later herein to select the number of rings 26a-26h to be raised. As illustrated in FIG. 5, the unscrambler 11 comprises a plurality of spacer stops 97 mounted on member 72 which provides stops for the ends of the plurality of racks 92-102 when they are driven toward the shaft 40. After such selection, the floor 20 and those ones of the selected rings 26a-26h are raised to the operating position, as illustrated in the rightmost portion of FIG. 5. Thus, the central portion 22 and the selected ones of rings 26a-26h are moved in a vertical direction of arrow A in FIG. 5 to a height that is generally smaller than the cross-sectional radius of the container 12. A side wall of the outer-most selected ring, such as side wall 26g5 in FIG. 8, cooperates with wall 30, surface 38a and top surfaces of all non-selected rings 26a-26f, such as surfaces 26a1-26f1 in the example, cooperate to define channel 32.

FIG. 5 illustrates the home position where the racks 92-102 are slidably driven in the manner described herein to select one or more of the rings 26a-26h to be raised to the operating position. This is performed while the floor 20 is at rest and not rotating. After the selection, the hand crank 81 is rotated to drive the threaded member 84 which drives the assembly of parts 39, 40, 20 and 22, for example, to a raised position that defines the operating position. The drive motor 42 may then be energized whereupon the member 72 rotates in response thereto, along with the floor 20, the rings 26a-26h and rim 28.

Referring to FIGS. 3-8, the unscrambler 11 comprises a bottom planar member, plate or portion 70 coupled via the spline bearing sleeve assembly 23 and a mount 25 (FIG. 3) to an intermediate planar member, plate, disc, or portion 72 on which the circular floor 20 is mounted. A drive assembly 74 is mounted on the bottom planar member or portion 70. Notice that the assembly 74 comprises a first plate 76 that is secured to member 70 with a plurality of supports or spacers, such as spacers 78 and 80, as best illustrated in FIG. 5. The intermediate plate 72 (FIGS. 2, 3 and 5) is mounted to bearing sleeve 23 and rotates as floor 20 rotates. The member 70 has a circular rim or edge 70a (FIG. 5) that is fastened, such as by a weld, to an inner surface 30a of wall 30. The floor 20 comprises the spline bearing collar or hub assembly 23 (FIG. 5) which is mounted on or constrained radially by plate hubs or mounts 25 and 27. The bearing assembly 23 receives the drive shaft 40, which is coupled to a conventional drive motor 42 (FIG. 5) for rotatably driving the floor 20 and the selected ones of rings 26a-26h described herein. Note that the plate mount 25 is mounted to member 72 and has a set screw (not shown) to secure it and member 70 to bearing 23. The disk mounting hub 51 secures the central portion 22 to the shaft 40. Note in FIGS. 2 and 5, the mounting hub 25 is mounted to the disc or member 72 and secured to the bearing 23 with the set screw mentioned earlier.

The assembly 74 has a hand crank 81 having the threaded member 84 is threadably received in a sleeve nut or threaded fixture 86 secured to plate 82. Plate 82 is coupled to circular floor 20 by a shaft 40. The intermediate plate 82 moves in response to rotation of the hand crank 81 in the direction of double arrow B in FIG. 5. Thus, for example, when the operator turns the crank 81 in a clockwise direction, the plate 82 is driven upward (as viewed in FIG. 5) and thereby raise the circular floor 20, and drive motor 42, which is mounted on plate 82 as well as any selected rings 26a-26h to the desired height, such as the illustrated heights H1 or H2. It should be appreciated that FIG. 5 is a fragmentary illustration about line 29 of the unscrambler 11 showing the floor 20 in two positions, with the left-hand portion of the FIG. 5 shown with the floor 20 in the lower or home position to accommodate a smaller diameter bottle and the rightmost portion of the FIG. 5 illustrating the floor 20 in a higher raised position to accommodate a larger diameter container 12. The floor 20 is, however, one continuous structure in cross-section.

Bearing sleeve 23 is a spline bushing with internal gear type teeth. Shaft 40 has the mating splined teeth to it, disk 20 is attached to the upper turned down portion of shaft 40 and set screwed to it, spline bearing mounts over spline shaft 40, and the remaining portion of shaft 40 is within the reducer/motor unit. Spline bushing is pressed into member 25 and set screwed solid. When disk 20 rotates so does member 72 as shaft 40 drives both. As disk 20 adjusts upward by assembly 74, assembly member 72 remains in position. So shaft 40 raises up and down bearing sleeve 23, thus disk 20 raises up and down and member 72 stays in a down position. The assembly 74 is adjusted by hand crank 81 which the motor assembly and shaft 40 raises as one unit which pushes disk 20 upward through members 72, 25 and 23 as shown. Note that the sleeve or collar 41 is part of shaft 40 all as one shaft assembly. Thus, by turning crank 81, the threaded member 84 simultaneously moves the parts 20, 22, and 40 and one or more of the selected rings 26a-26h, for example, from the home position shown in the left of FIG. 5 (i.e., to the left of line 29 in FIG. 5) to the operating position shown in the right of FIG. 5 (i.e., to the right of line 29 in FIG. 5). The entire central portion 22 is raised along with any of the plurality of ring members 26a-26h that are supported by the racks 92-102. In the example in FIG. 5, only ring 26a is shown as being selected and the remaining rings 26b-26h remain biased against member 72 as shown, and their top surfaces 26b1-26h1 and the top surface 28a of rim 28 provide a floor of the channel 32.

Figure 4:
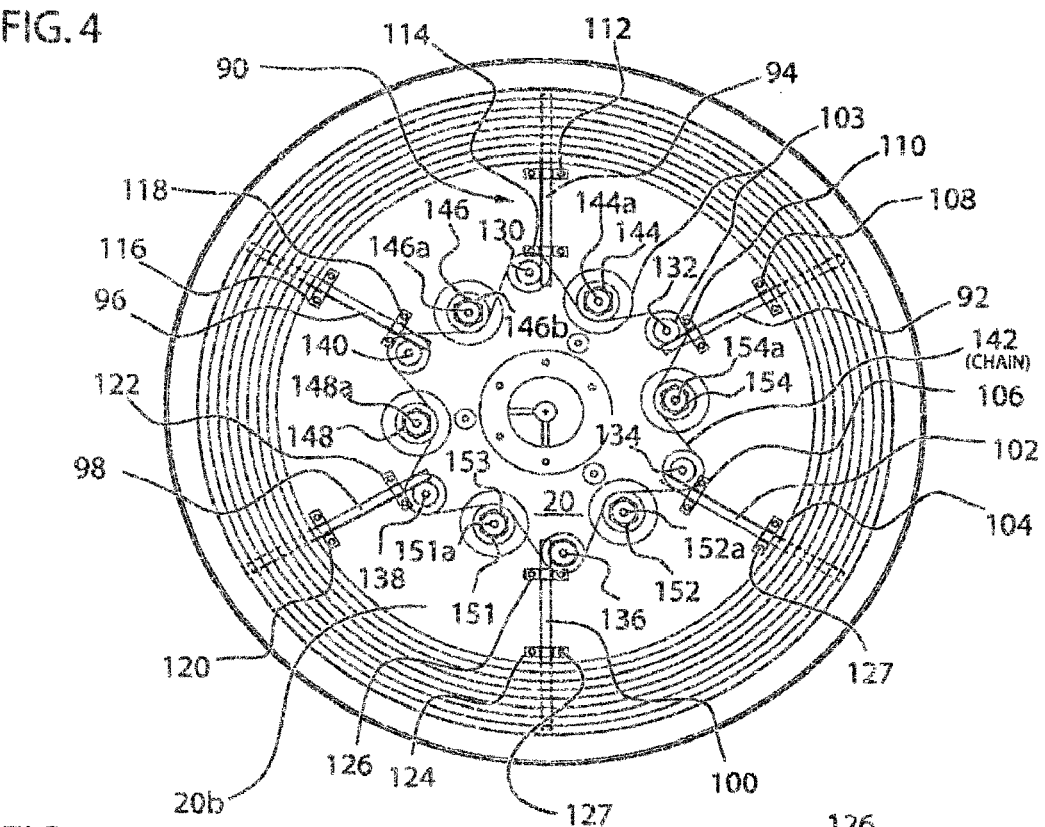
FIG. 4 is a bottom view of a floor of the unscrambler.
Figure 6:
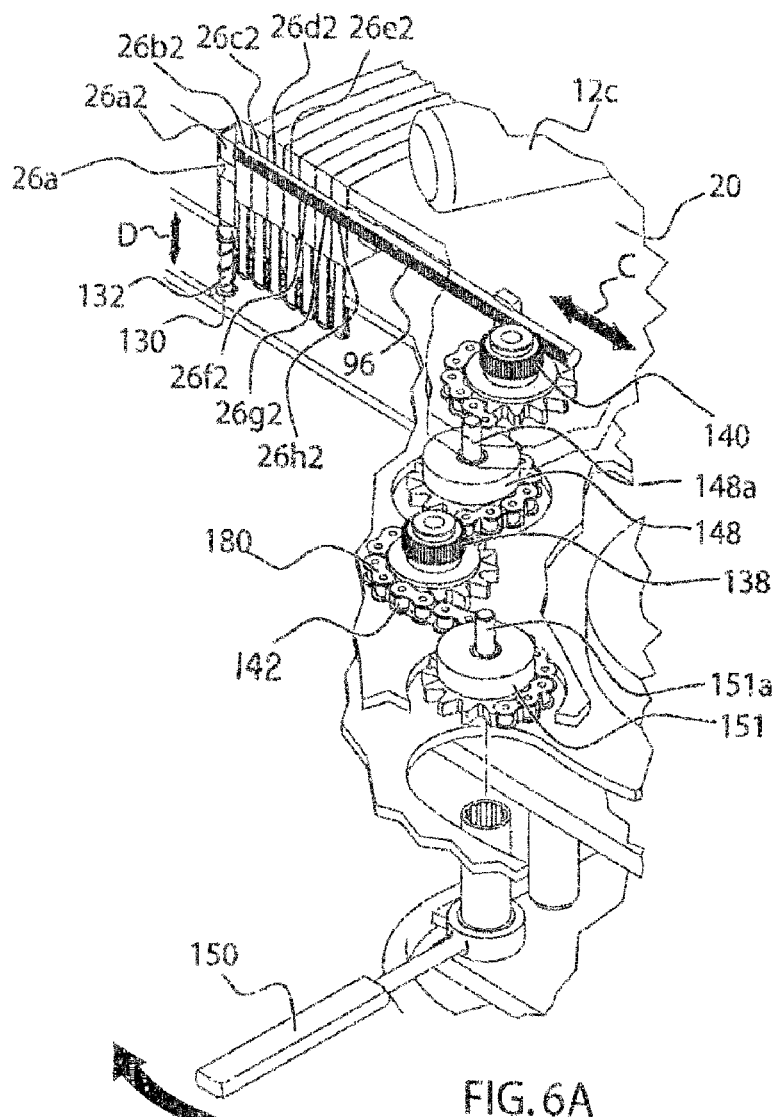
FIG. 6 is fragmentary sectional view showing a rack and pinion assembly for selecting and supporting one or more of the plurality of ring members.

Referring now to FIGS. 2 and 4-6, the method and apparatus for selecting one or more of the plurality of ring members 26a-26h will now be described. FIG. 4 is a bottom view of the floor 20 without the bottom plates or members 70 and 72. A plurality of racks 92-102 are mounted or secured to the side 20b of the floor 20 with a plurality of brackets or mounts 104-126 with suitable fasteners, such as by screws 127 as shown. As illustrated in FIGS. 4 and 6, the racks 92-102 may be driven along their axis. For example, rack 96 may be driven in the direction of double arrow C in FIG. 6.

Figure 6A:
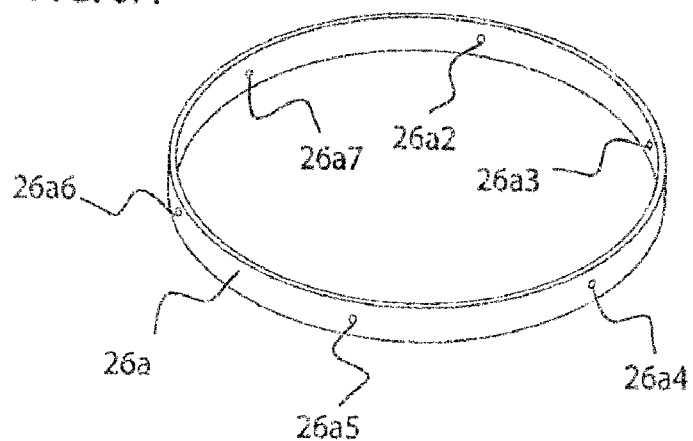
FIG. 6A is a perspective view of a single concentric ring member, illustrating a plurality of apertures though which a rack may be driven.

It should be understood that each of the plurality of ring members 26a-26h comprise a plurality of holes or apertures, such as apertures 26a2-26a7 in FIG. 6A or apertures 26a2-26h2 in FIG. 6 (only half of which are shown for illustrating the movement of the rack in the apertures 26a1-26h1). The apertures 26a2-26h2 each have a center that becomes generally aligned with the axis of the rack to which it is associated when the rack is in a retracted position. Thus, rack 96 in FIG. 6 becomes aligned with apertures 26a2-26h2 of the rings 26a-26h, respectively, when the rings 26a-26h are in the home or lowered position mentioned earlier. Such alignment enables each of the racks 92-102 to move into and through the holes 26a2-26h2. In this illustration, notice in FIG. 6A, the ring 26a comprises the plurality apertures 26a2-26a7, and hole 26a2 becomes generally aligned with the corresponding apertures 26b2-26h2 in the other rings 26b-26h, respectively.

It should be understood that the plurality of rings 26a-26h are biased downward (as viewed in FIG. 8) by the springs 62 which are mounted on a plurality of spaced columns or shafts 26a3-26h3. The springs 62 are held in place by a push nut, spring nut or the like. As best shown in FIG. 7, the shafts 26a3-26h3 extend through apertures, such as apertures 72a-72h (only half of which is shown in FIG. 7 for ease of illustration). Thus, when the racks 92-102 are not received in apertures 26a2-26h2, the plurality of rings 26a-26h become biased in the home or down position by their respective spring 62. For example, FIG. 8 illustrates the plurality of rings 26a-26f biased downward (as viewed in the FIG. 8) by springs 62. In contrast, the rack 96 in the example extends through each of the apertures 26g2 and 26h2 of the plurality of rings 26g and 26h, respectively, which are raised against the force of springs 62 as shown. As mentioned earlier, the number of rings 26a-26h selected to be raised or moved to the operating position is related to the diameter and/or shape of the container 12 being processed. Thus, the system 10 and unscrambler 11 can accommodate numerous container sizes, such as the relatively small diameter container 12b in FIG. 5 or a relatively larger container 12a shown in the rightmost portion of FIG. 5.

Referring to FIG. 4, the various racks 92-102 are slidably driven by a pinion drive assembly 103 having a plurality of pinion gears or pinions 130-140 which engage the rack teeth, such as teeth 96a in FIG. 8, and drive the racks 92-102, respectively. Notice in FIG. 6 that each pinion, such as pinions 138 and 140 (FIG. 4), comprises an associated sprocket 140a and 138a that is driven by a drive chain 142. A plurality of spacer or guide sprockets 144-154 that are rotatably mounted between pinions 130-140 on associated shafts 144a-154a as shown.

When it is desired to drive the racks 92-102 in the direction of double arrow C in FIG. 6, the operator uses a wrench or tool 150 (FIG. 6) to rotatably drive a nut 153 (FIG. 4) which in turn drives chain 142 to drive the various rack and pinion combinations. This causes racks 92-102 to be driven into and out of the various apertures in the plurality of ring members 26a-26h, such as apertures 26a2-26h2 (FIG. 6).

If necessary, the operator may rotate the hand crank 81 (FIG. 5) to lower the floor 20, central portion 22 and rings 26a-26h to the down or home position whereupon the top surface 20a of floor 20 and top surfaces 26a1-26h1 (FIG. 8) and first edge 24a of rim 24 are generally coplanar. The operator then selects one or more of the ring members 26a-26h to be moved to the operating position in response to the size of the container 12 being processed. For example, the left-most portion of FIG. 5 illustrates all of the plurality of ring members 26a-26h being selected and raised to define channel 32 for a relatively small diameter container 12b. In contrast, the rightmost portion of FIG. 5 illustrates the plurality of ring members 26b-26h selected, except for ring member 26a, so that the defined channel 32 can accommodate a slightly larger container 12a. Notice in the example shown in the rightmost portion of FIG. 5, only the innermost ring member 26h is selected and raised to the operating position so that the relatively larger container 12a may be processed.

The operator actuates the various pinions 130-140 by driving a chain 142. In this regard, the operator uses the wrench 150 to drive a nut, such as nut 153 in FIG. 4, associated with each sprocket 144-154, which in turn drive the racks 92-102 until the appropriate number of the plurality of ring members 26a-26h are supported by the racks 92-102. Notice that the pinion drive assembly 103 is coupled via the chain 142 to each pinion gear 130-140. When operator rotates one of the nuts associated with sprockets 144, 146, 148, 151, 152 and 154 using tool 150 (FIG. 6), the pinions 130, 132, 134, 136, 138 and 140 are substantially simultaneously rotatably driven, which in turn drives racks 92-102.

After the correct or desired number of rings 26a-26h are selected, the height, such as height H1 or H2 in FIG. 5, of floor 20 may be adjusted by rotating the hand crank 81 to thereby raise the desired height of the floor 20 and the selected ring members 26a-26h. In general, the floor 20 and the selected ring members 26a-26h are raised to the height, such as height H1 or H2, that is generally smaller than the radius of the container 12 being processed. Note, for example, in FIG. 8 that it has been found that the corner of the outermost ring selected (such as edge 26g4 of ring 26g) engages side 12c1 which facilitates retaining the container 12c in channel 32 and against the inner surface 30a of wall 30 as the floor 20 is rotatably driven by the motor 42 (FIG. 2).

As alluded to earlier herein, the central portion 22 is dome-shaped or comprises a curvature that urges the containers 12 toward the wall 30. Centrifugal forces also facilitate driving the containers 12 toward wall 30. As the containers 12 are guided toward the wall 30, they become positioned in the track or channel 32 and guided via channel 32 to a guide flange 160 (FIG. 2) and into an opening 14a (FIGS. 1 and 2) of the adjustable chute 14 which will now be described relative to FIGS. 9-15D.

As illustrated in FIGS. 1-2, the flange 160 guides containers 12 into the opening 14a as floor 20 rotates in a counter-clockwise direction in FIG. 1. Those of the containers 12 that are oriented in a generally horizontal position as they settle within the track 32 and adjustable chute 14 guides them to a generally vertical position as illustrated in FIG. 2. The containers 12 are then subject to further processing at one or more subsequent stations 17 (FIG. 2), such as an indexing station, capping station, filling station, orienting station and the like.

As mentioned earlier herein in the Background of the Invention, a common problem with prior art devices was that the chute typically had a fixed size and could not easily accommodate containers 12 of different sizes. In contrast, the adjustable chute 14 in the embodiment being described is capable of accommodating a plurality of different size or diameter containers 12. In this regard, the adjustable chute 14 has an adjustable guide chute, channel or track 162 through which the containers 12 pass from the unscrambling bowl 18 to the subsequent processing station 17.

Figure 9:
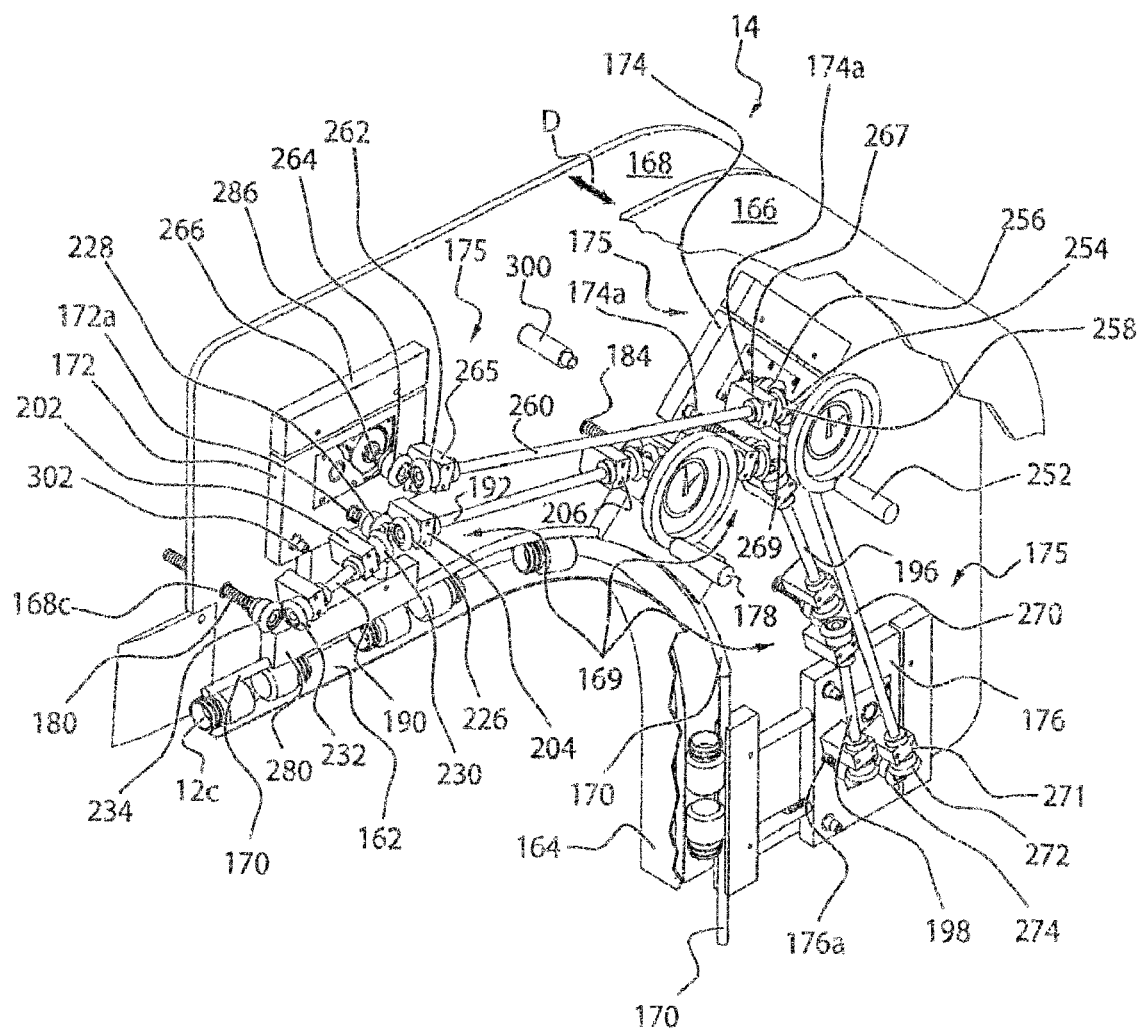
FIG. 9 is a fragmentary view illustrating various features of the adjustable chute.
Figure 10:
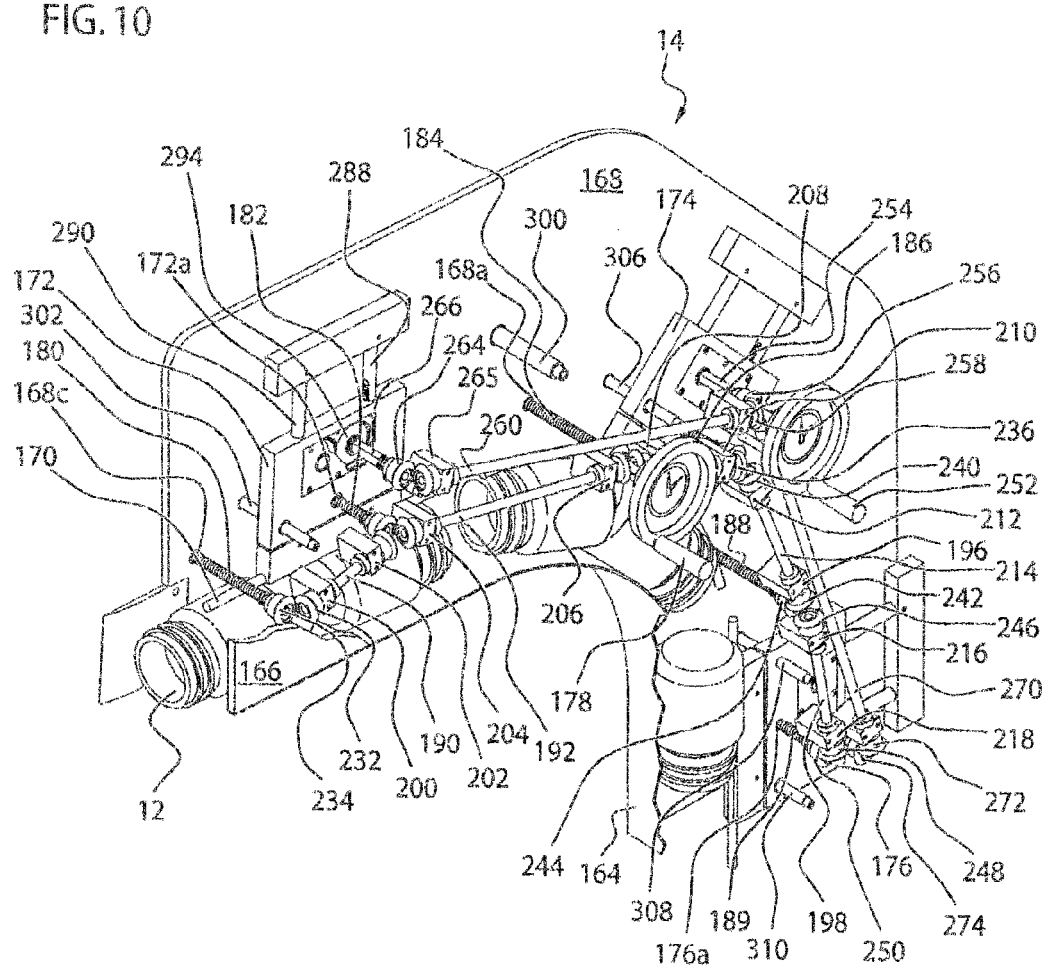
FIG. 10 is a view similar to FIG. 9 showing the adjustable chute accommodating relatively larger container sizes.

As illustrated in FIG. 9-11B, the adjustable chute 14 comprises the channel 162 defined by a first wall member or floor 164, a second wall member 166 and a movable wall member 168. The track or channel 162 is further bounded by a movable and flexible tube or tubular member 170 that is supported by three tubular supports 172, 174 and 176, as best illustrated in FIGS. 9 and 10. The function and operation of the tubular supports 172-176 will be described later herein.

Figure 11A:
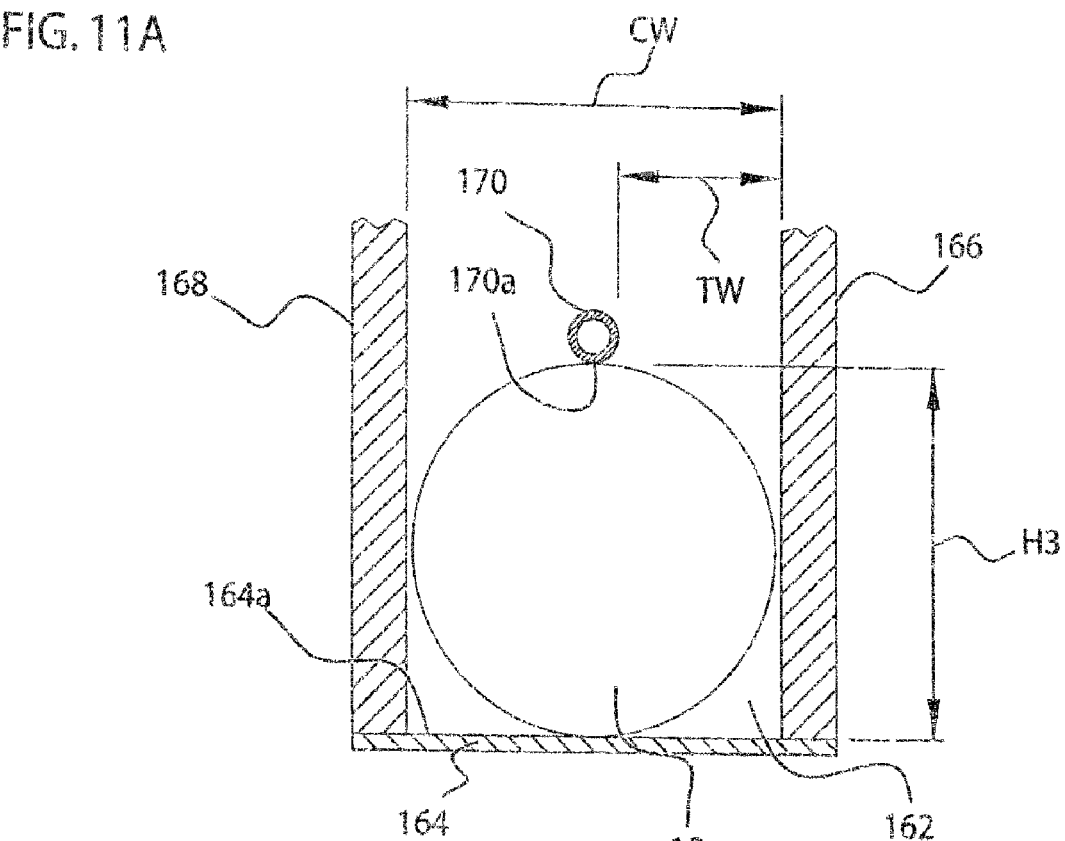
FIG. 11A is a fragmentary sectional view showing a channel defined by a plurality of members or walls.
Figure 11B:
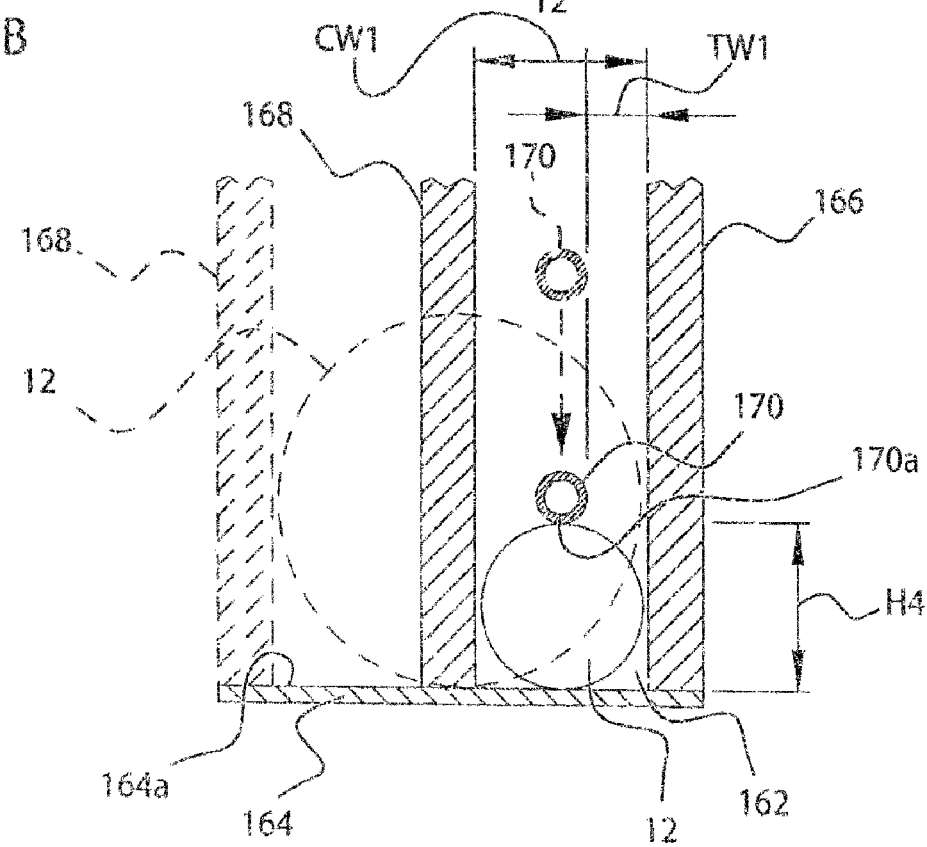
FIG. 11B is a fragmentary sectional view, similar to the FIG. 11A, showing one of the walls moved closer to the other and the flexible tubular member moved to a position such that a smaller channel is provided to accommodate a container having a relatively smaller diameter than the container shown in FIG. 11A.

It is important to note that the adjustable chute 14 is adjustable in that the size of the channel 162 may be changed to accommodate containers 12 of varying sizes or diameters. For example, FIG. 11A is a fragmentary sectional view illustrating wall members 166 and 168 cooperating with the floor or wall member 164 and tubular member 170 to define the channel 162 for receiving a relatively large diameter container 12. For purposes of illustration, a smaller diameter container 12 is shown in FIG. 11B with the position of the wall member 168 and tubular member 170 being changed to accommodate the change in diameter of the container 12, thereby making the channel 162 relatively smaller. Thus, the size and dimension of channel 162 is variable and adjustable so that it generally corresponds to an overall size that is slightly larger than the cross-sectional width or diameter of container 12, so that the container 12 can move freely and easily through the chute 162 from the generally horizontal position while in the unscrambling bowl 18 to the vertical position (as illustrated in FIG. 2). The means, system and apparati for moving the wall 168 relative to wall 166 will now be described.

The adjustable chute 14 comprises the first wall member 166 which is mounted in a fixed position to the further processing station 17. FIGS. 9, 10, 12A-12D and 13A-13C, are various views with the wall 166 removed or fragmented so as to show details of various features of this embodiment. The second wall member 168 is generally parallel to the first wall member 166 and is movable in the direction of double arrow D in FIG. 9 so that the distance therebetween or channel width CW (FIG. 11A) may be changed and adjusted. The adjustable chute 14 comprises a wall hand crank 178 (FIGS. 9 and 10) that is rotatably driven by the operator. The wall hand crank 178 is coupled to drive linkage 169 (FIG. 9) and drives a plurality of threaded rods or members 180, 182, 184, 186, 188 and 189 via drive linkage 190, 192, 194 (FIG. 12A), 196 and 198 as shown in FIGS. 9, 10 and 12A. The drive linkage 169 is mounted in bearing blocks 200, 202, 204, 206, 208, 210, 212, 214, 216 and 218 as shown. The bearing blocks 200-218 are mounted or secured to wall 166 with screws or fasteners (not shown).

As illustrated in FIGS. 12A and 12B, the hand crank 178 drives a first bevel gear 222 which is mounted on the threaded rod 184 as shown. The bevel gear 222 in turn drives bevel gear 224 and bevel gear 226 (FIG. 12A). The gears 224 and 226 drive linkage arms 190 and 194, respectively. Bevel gear 226 drives bevel gear 228 which in turn drives both threaded rod 182 and bevel gear 230. Bevel gear 230 drives link 190 and bevel gear 232. The bevel gear 232 drives bevel gear 234 which drives threaded rod 180.

Similarly, the bevel gear 226 drives the link 194 (FIG. 12A) which drives bevel gear 236. Bevel gear 236 drives bevel gear 238 which is coupled to threaded rod 186 (FIG. 12A). Bevel gear 238 rotatably drives bevel gear 240 which in turn drives link arm 196 (FIG. 10), which drives bevel gear 242. Bevel gear 242 (FIG. 10) drives bevel gear 244 which rotatably drives threaded rod 188 as shown. Bevel gear 244 in turn drives bevel gear 246 which rotatably drives the link 198 that drives bevel gear 248. Gear 248 rotatably drives the threaded rod 189. The aforementioned drive linkage arrangement enables the adjustable chute 14 to be capable of adjusting the position of the wall 168 relative to the wall 166 in order to adjust the dimension (e.g., dimension CW and CW1 in FIGS. 11A and 11B, respectively) or distance between walls 166 and 168.

Notice that the threaded rods 180, 184 and 188 are received in threaded openings, such as openings 168*c* in FIG. 12E, in wall 168. Thus, when operator turns crank 178, clockwise or counterclockwise, the linkage rotatably drives threaded rods 180, 184 and 188 to cause wall 168 to move closer to or farther from wall 166, respectively, thereby changing the dimension or distance CW between walls 166 and 168.

The adjustable chute 14 comprises means for adjusting the position of the tubular supports 172-176 and, therefore, tubular member 170 relative to walls 166 and 168. As the operator rotates the hand crank 178 in the clockwise direction (as viewed in FIG. 10), the aforementioned linkage drives the threaded rods 180, 184 and 188 as mentioned to move the wall 168, for example, in the direction of arrow D in FIG. 12F. The movement of the hand crank 178 also simultaneously drives the threaded rods 182, 186 and 189 (FIG. 10) in threaded openings 172*a* (FIG. 9), 174*a* and 176*a*. This causes the supports 172, 174 and 176 to move in the same direction (i.e., in the direction of arrow D in FIG. 12F in the illustration) and substantially simultaneously as the movement of wall 168. Likewise, when the operator rotates the wall hand crank 178 in a counterclockwise direction, the wall 168 moves in the direction of arrow E in FIG. 12E to widen the distance CW (FIG. 11A) between wall 166 and wall 168. Substantially simultaneously, the linkage also drives the threaded rods 182, 186 and 189 to drive the tubular supports 172, 174 and 176 in the same direction so that a distance TW (FIG. 11A) can be adjusted. This enables the position of tubular member 170 to be adjusted so that it is generally centrally located between the walls 166 and 168, as illustrated in FIGS. 11A and 11B. Preferably, the walls 166 and 168 are adjusted to the width CW (FIG. 11A) such that it is slightly larger than the diameter of the container 12. Substantially simultaneously, the tubular member 170 and the distance TW (FIG. 11A) between the tubular member 170 and the wall 166 is adjusted to a distance that generally corresponds to or is slightly larger than the radius of the container 12. The apparati and method of the example being described also comprises means for adjusting a height or distance H3 (FIG. 11A) and H4 (FIG. 11B) between the tubular member 170 and floor or wall member 164 which will now be described.

The adjustable chute 14 comprises a tubular position hand crank 252 (FIGS. 9 and 10) that drives a shaft 254 and bevel gear 256 that is coupled to and drives a second bevel gear 258 (FIG. 9). Gear 258 rotatably drives a link arm 260 that drives a bevel gear 262. Gear 262 drives a bevel gear 264 that drives a shaft 266. The link arm 260 is mounted in bearing brackets 265 and 267 that are mounted with suitable fasteners or screws (not shown) to wall 166 (which, again, is shown in fragmentary view for ease of illustration in FIG. 9).

Figure 13A:
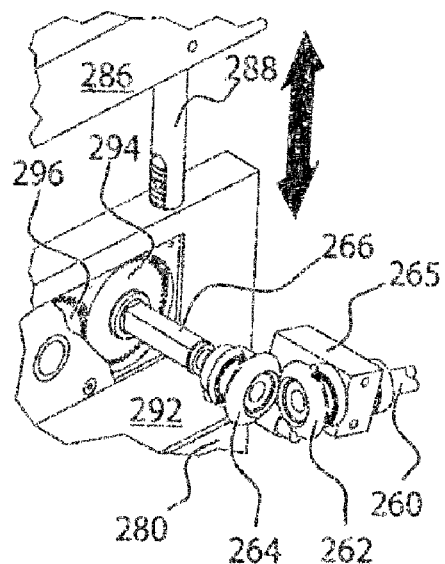
FIGS. 13A-13C are views illustrating further features of the embodiments shown in FIGS. 9 and 10 and particularly the apparatus and means for raising and lowering the tubular member.
Figure 13B:
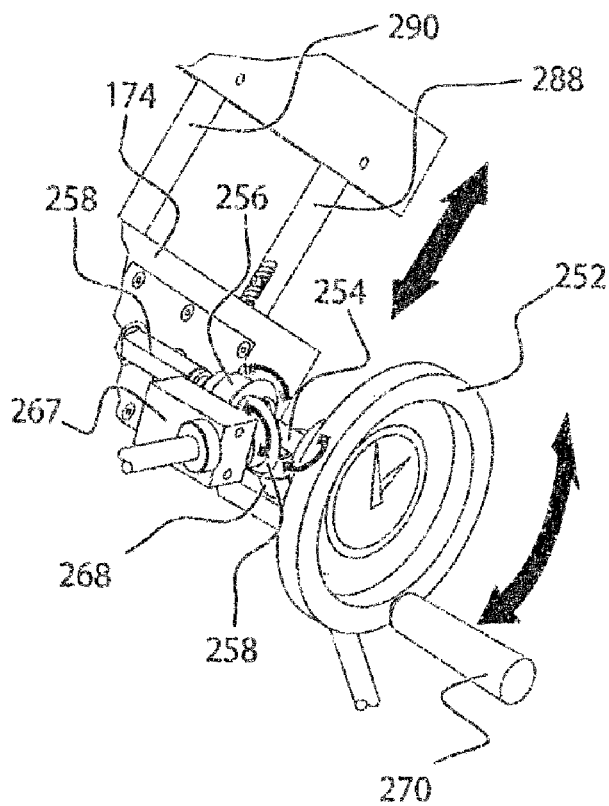
Figure 13C:
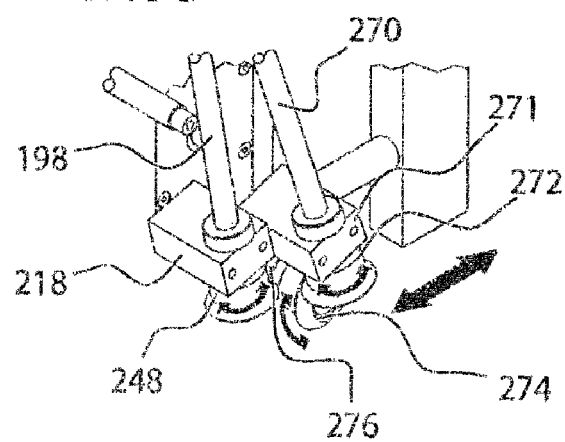

The bevel gear 256 (FIG. 9) also rotatably drives bevel gear 258 which rotatably drives shaft 270 and bevel gear 272. Gear 272 drives bevel gear 274 which rotatably drives a shaft 276 (FIG. 13C). Notice that the link arm 270 is mounted in bearing brackets 269 and 271 (FIG. 13C) that are secured or fastened to wall 166 with screws or fasteners (not shown).

Figure 14:
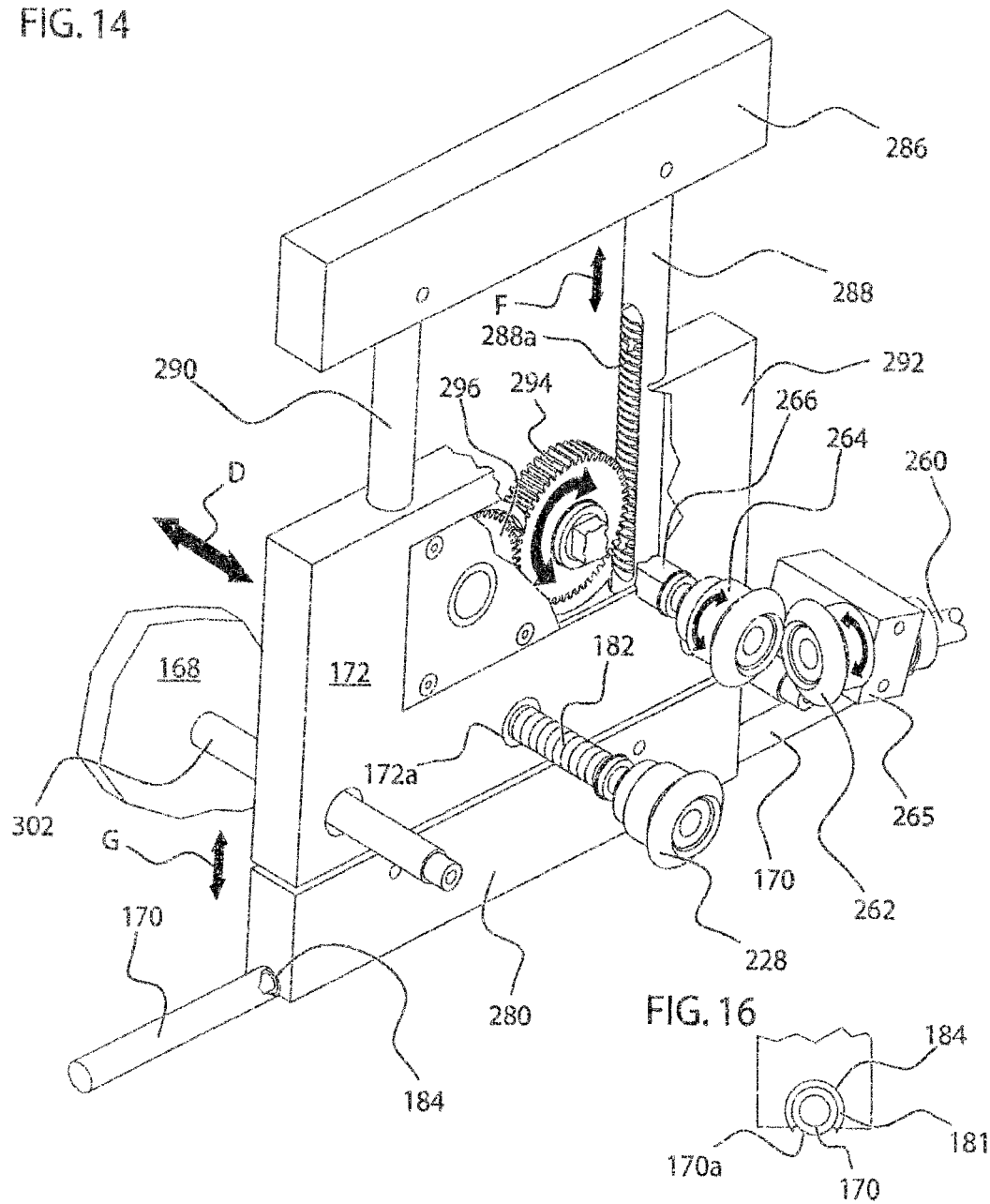
FIG. 14 is a view of a tubular support showing details of the various bevel gears and driven gear that drive a tubular support.
Figure 16:
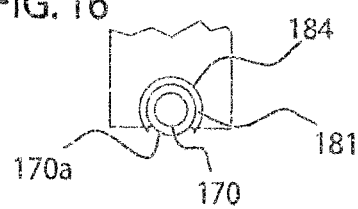
FIG. 16 is a fragmentary sectional view showing an aperture in the tubular support for receiving a tube.

Referring now to FIG. 14, the tubular support 172 will now be described in more detail. It should be understood that the supports 174 and 176 comprise like parts and operate in substantially the same manner as support 172. As illustrated in FIG. 14, the tubular support 172 comprises a tubular support member 280 which receives, supports and houses the flexible tube 170 in an aperture 181 (FIG. 16) defined by wall 184. The tube support member 280 may have an aperture therethrough for receiving the tube 170 as shown or may have bottom brackets (not shown) for retaining the tube in the aperture 181 (FIG. 16).

The tube support 280 is coupled to an opposing support 286 (FIG. 14) via two threaded racks 288 and 290 as shown. The tubular support 172 comprises a gear housing portion 292 that houses a plurality of mating gears 294, 296 that engage teeth, such as teeth 288*a* on rack 288, on the racks 288 and 290 to drive the tubular support 280 in the direction of double arrow G in FIG. 14. As mentioned previously herein, the tubular support 172 and, more specifically, gear housing 292 is mounted on the threaded rod 182 that, as described earlier herein, is rotated in response to rotation of hand crank 178 to move the support in the direction of double arrow F in FIG. 14.

When it is desired to adjust the position or distance between the surface or bottom portion 170*a* of tube 170, such as between distance H3 in FIG. 11A and distance H4 in FIG. 11B in the illustration, the operator rotates the hand crank 252 in either a clockwise or counterclockwise direction. If, for example, the operator rotates the hand crank 252 in the clockwise direction in FIGS. 9 and 10, the bevel gear 256 will drive the gears 258 and 268, which, in turn, drive shafts 260 and 270. The shafts 260, 270 drive the gears 264 and 274, respectively (FIGS. 15A and 15B). The rotation of shafts 254 (FIG. 13B), 266 (FIG. 13A) and 276 (FIG. 13C) causes the gear to which it is attached, such as gear 294 in the example of FIGS. 15A-15B to rotate in response thereto. The gear 294 drives mating gear 296 and both simultaneously drive the teeth on their respective racks 288 and 290. The racks 288 and 290 cause the tubular support 280 and tube 170 to move, for example, from the position illustrated in FIGS. 11A and 12E to the position shown in FIGS. 11B and 12F where the distance H4 (FIG. 11B) between the surface or bottom portion 170*a* and surface 164*a* mentioned earlier herein is smaller than distance H3 (FIG. 11A) in order to accommodate smaller-sized containers 12. Thus, notice in the illustration of FIG. 15A, the tube support 280 is in its most extreme position or furthest distance H3 (FIG. 11A) away from wall member 164 to accommodate a relatively large-diameter container 12. FIG. 15B illustrates the tube support 280 in its downmost position, where the distance H4 (FIG. 11B) between the tube 170 and wall 164 is narrowest to accommodate a relatively smaller shaped or sized container 12.

It should be understood, however, that the adjustable chute 14 is capable of an infinite number of adjustable positions between the positions shown in FIGS. 15A and 15B by actuating the hand crank 252 until the tube 170 is moved to the desired position. Notice that the three tubular supports 172, 174 and 176 cooperate substantially simultaneously to cause the tube 170 in response to the rotation of crank 252 to move towards and away from the wall 164. By moving the wall member 168 in response to the rotation of crank 178 and substantially simultaneously moving tube 170 in response to rotation of crank 252, the operator can adjust the dimension of channel 162, thereby enabling channel 162 to accommodate containers 12 of different sizes.

In the embodiment being described, note that the tube 170 is made of stainless steel. Thus, the tube 170 is flexible and remains generally parallel to the wall 164 as it curves from a horizontal position as viewed in the leftmost portion of FIG. 9 to a generally vertical position (as viewed in toward the rightmost portion of FIG. 9). The tube supports 172-176 enable the relative position between wall 164 and tube 170 to remain substantially constant.

The adjustable chute 14 also comprises a plurality of spacers, such as spacers 302, 304, 306, 308 and 310 (FIG. 10), that are mounted and affixed to wall 166 and which provide alignment guides and support for wall 168 and tubular supports 172, 174 and 176.

The system 10 may comprise a cover 167 (FIG. 1) for concealing any of linkage or the gear assemblies mentioned herein.

During one operating procedure, the operator may adjust hand crank 178 to adjust the relative distance between walls 166 and 168 and substantially simultaneously, adjusts the positions of the tubular supports 172, 174 and 176 to a position such that the tubular member 170 is generally centered between the walls 166 and 168. The operator may then rotate the hand crank 252 to adjust the position of the tube 170 relative to wall 164 in the manner described earlier herein.

In general, the distance H3 (FIG. 11A) and the distance CW will generally be on the order of about one-eighth inch larger than the cross-sectional shape of the container 12 being processed. If the container 12 being processed is circular in cross-section, then the distance CW and H3 (FIG. 11A) will be slightly larger by about one-eighth inch than the diameter of the container 12 so that container 12 does not become stuck between the walls 166 and 168. If, for example, the container 12 has a non-circular shape, such as rectangular, polygonal or the like, then a greater or lesser distance H3 and CW may be selected.

The user may adjust the size of the unscrambler track or channel 32 and adjustable chute 14 channel 162 so that they generally correspond to the size of the container 12 being processed.

As illustrated, note that the channel 162 is generally curved. If the container 12 has, for example, a length that is large relative to its diameter, then it may be desired to have a slightly larger gap or distance CW between the container walls 166 and 168 in order to facilitate enabling the container 12 to smoothly negotiate the curving channel 162.

In one embodiment, the rim 24 has a diameter of about twenty-five and one-half inches and a width of about one and one-half inch. Each ring 26a-26h has a width across its top surface 26a1-26h1 (FIG. 8) of about one-half inch, the central portion 22 has a diameter of about twenty-five and one-half inches thereby making the floor 20 have an overall diameter of about thirty-six inches. In the embodiment being described, the central portion 22 of floor 20 has a thickness of about one-half inch. The rings 26a-26h have a thickness of about one-half inch. Advantageously, the channels 32 and 162 are both adjustable and variable in size so that they can receive, support, direct and channel containers 12 having diameters, for example, of about one and one-eighth inch to about five inches.

Converting the system 10 from one size container 12 to a container of a different size does not require change out of parts, such as of the floor or bowl tooling, as required in the past. Thus, one feature of the example being described is that it is capable of handling containers of varying sizes and shapes and in one embodiment the containers can range from one and one-eighth to five inches in cross-section.

It should be understood that the floor 20 of the unscrambler 11 may be made of a polymer material High Density Polyethylene, and it is envisioned that the central portion 22 of floor 20, rim 24 and the plurality of ring members 26a-26h may be cut from a single piece of material, such as by using a laser knife.

It should be appreciated that other mechanisms and means for causing the chute to be adjustable and capable of handling bottles of a plurality of sizes may be performed without departing from the true spirit and scope of the invention.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An unscrambler comprising:
    a floor comprising a central portion having a first side and a second side; said central portion being generally circular and comprising a first wall;
    a second wall spaced apart from said first wall and extending around at least a portion of said central portion; said second wall and said first wall cooperating to define a channel having a first predetermined dimension;
    a drive motor for rotatably driving said floor;
    said first wall of said central portion having a diameter that is variable in order to change said first predetermined dimension; and
    wherein said floor comprises a plurality of concentric rings situated about said central portion, each of said plurality of concentric rings being independently or simultaneously selectable to change said first predetermined dimension.

2. The unscrambler as recited in claim 1 wherein said first predetermined dimension is a distance between said first wall and said second wall.

3. The unscrambler as recited in claim 1 wherein said floor comprises a plurality of concentric rings situated about said central portion, at least one of said plurality of concentric rings defining said second wall.

4. The unscrambler as recited in claim 1 wherein said unscrambler comprises at least one slidable support associated with said second side for selecting one or more of said plurality of concentric rings.

5. The unscrambler as recited in claim 1 wherein said unscrambler comprises a plurality of slidable supports associated with said second side for selecting one or more of said plurality of concentric rings.

6. The unscrambler as recited in claim 1 wherein said at least one slidable support comprises a rack, said unscrambler further comprising:
    a pinion for slidably driving said rack; and
    a drive train for driving said pinion.

7. The unscrambler as recited in claim 1 wherein said plurality of slidable supports are driven by a drive train.

8. The unscrambler as recited in claim 1 wherein said unscrambler comprises a lift assembly coupled to said floor for moving said floor between a home position and an operating position.

9. An unscrambler comprising:
    a floor comprising a central portion having a first side and a second side; said central portion being generally circular and comprising a first wall;
    a second wall spaced apart from said first wall and extending around at least a portion of said central portion; said second wall and said first wall cooperating to define a channel having a first predetermined dimension;
    a drive motor for rotatably driving said floor;

said first wall of said central portion having a diameter that is variable in order to change said first predetermined dimension;

wherein said floor comprises a plurality of concentric rings situated about said central portion, at least one of said plurality of concentric rings defining said second wall; and wherein each of said plurality of concentric rings comprises a plurality of apertures that are generally aligned when said plurality of concentric rings are situated in a home position;

said unscrambler further comprising a plurality of slidable supports that are generally aligned with and capable of being driven into said plurality of apertures.

10. An unscrambler comprising:

a floor comprising a central portion having a first side and a second side; said central portion being generally circular and comprising a first wall;

a second wall spaced apart from said first wall and extending around at least a portion of said central portion; said second wall and said first wall cooperating to define a channel having a first predetermined dimension;

a drive motor for rotatably driving said floor;

said first wall of said central portion having a diameter that is variable in order to change said first predetermined dimension;

wherein said floor comprises a plurality of concentric rings situated about said central portion, at least one of said plurality of concentric rings defining said second wall;

wherein said unscrambler comprises a plurality of slidable supports associated with said second side for selecting one or more of said plurality of concentric rings; and wherein each of said plurality of slidable supports comprises a rack, said unscrambler further comprises:

a plurality of pinions operatively engaging said plurality of slidable supports; and a drive train coupled to said plurality of pinions for rotatably driving said plurality of pinions and driving said plurality of slidable supports in response thereto.

11. The unscrambler as recited in claim 10 wherein each of said plurality of pinions comprises a sprocket, said unscrambler further comprising a chain for coupling said sprocket to provide substantially simultaneous movement of said plurality of pin ions when said chain is driven.

12. The unscrambler as recited in claim 11 wherein a second predetermined distance is defined by a bottom of said channel and a top edge of said first wall; said second predetermined distance being less than a radius of a container being processed.

13. The unscrambler as recited in claim 12 wherein said first predetermined distance is less than a diameter of a radius of a container being processed.

14. The unscrambler as recited in claim 11 wherein said first predetermined distance is less than a diameter of a radius of said container being processed.

15. An unscrambler comprising a channel that is adjustable in size to accommodate containers of different sizes, said unscrambler comprising:

a central floor for defining at least a portion of a floor of said unscrambler;

a plurality of concentric rings surrounding said central floor;

a drive motor for rotatably driving said central floor and said plurality of concentric rings;

an unscrambler wall surrounding said central floor and said plurality of concentric rings; and a ring drive assembly for selecting at least one of said plurality of concentric rings and also for moving it from a home position to an operating position, with a ring wall of the at least one of said plurality of concentric rings that is in the operating position and said unscrambler wall defining the channel for receiving a container to be processed.

16. The unscrambler as recited in claim 15 wherein a top surface of any of said plurality of concentric rings that are not raised defines at least a part of a floor of said channel.

17. The unscrambler as recited in claim 15 wherein said central floor and said plurality of concentric rings lie in a first plane, with said unscrambler wall lying in a second plane that is generally perpendicular to said first plane.

18. The unscrambler as recited in claim 15 wherein said ring drive assembly comprises:

a rack and pinion assembly that, responsive to a movement of an associated pinion, drives at least one rack into operative relationship with said at least one of said plurality of concentric rings to select said at least one of said plurality of concentric rings to be moved to said operating position.

19. The unscrambler as recited in claim 15 wherein said ring drive assembly comprises:

a rack and pinion assembly that, responsive to a movement of a plurality of pinions, drives a plurality of racks into operative relationship with said at least one of said plurality of concentric rings to select the said at least one of said plurality of concentric rings to be moved to said operating position.

20. The unscrambler as recited in claim 19 wherein said rack and pinion assembly is coupled to said central floor.

21. The unscrambler as recited in claim 19 wherein said unscrambler further comprises biasing means for biasing those of said plurality of concentric rings that are not selected to be moved into said operating position, into said home position.

22. The unscrambler as recited in claim 19 wherein said unscrambler further comprises a rim situated adjacent said unscrambler wall, said rim and those of said plurality of concentric rings that are not selected to be raised to said operating position cooperating to define a floor of said channel.

23. The unscrambler as recited in claim 15 wherein said unscrambler further comprises:

a drive shaft onto which a central portion is mounted;

a first planar member also mounted on said drive shaft and situated adjacent said central portion;

a second planar member that is generally parallel to said first planar member;

said ring drive assembly being coupled to said second planar member and capable of moving said first planar member and said floor.

24. The unscrambler as recited in claim 15 wherein said unscrambler further comprises:

a drive shaft onto which said central portion is mounted;

a first planar member also mounted on said drive shaft and situated adjacent said central portion;

a second planar member that is generally parallel to said first planar member;

said ring drive assembly being coupled to said second planar member and capable of moving said first planar member and said floor.

25. The unscrambler as recited in claim 15 wherein said channel is circular and adjacent said unscrambler wall.

26. An unscrambler for unscrambling containers comprising:

a bowl having a bowl wall;
a turret situated in the bowl;
a drive system coupled to said turret for rotatably driving said turret;
said drive system also being capable of driving said turret along an axis of rotation from a home position to an operating position;
wherein said turret comprises:
a first planar member;
a second member situated on said first planar member, an outer edge of said second member cooperating with said bowl wall to define a channel having a predetermined depth and width; and
wherein said second member comprises:
a central portion and a plurality of concentric rings that are actuatable from said home position to said operating position.

27. The unscrambler as recited in claim 26 wherein said turret comprises:
a first planar member;
a second member situated on said first planar member, an outer edge of said second member cooperating with said bowl wall to define a channel having a predetermined depth and width.

28. The unscrambler as recited in claim 26 wherein said unscrambler further comprises:
a ring selection system for selecting at least one of said plurality of concentric rings to be moved between said home position and said operating position.

29. The unscrambler as recited in claim 28 wherein said ring selection system comprises a rack and pinion assembly.

30. The unscrambler as recited in claim 26 wherein said second member is situated in a generally horizontal plane and comprises a top surface having a curvature for urging said containers toward said bowl wall.

31. An unscrambler for unscrambling containers comprising:
a bowl having a bowl wall;
a turret situated in the bowl;
a drive system coupled to said turret for rotatably driving said turret;
said drive system also being capable of driving said turret along an axis of rotation from a home position to an operating position; and
wherein said second member comprises:
a central portion and a plurality of concentric rings that are actuatable from said home position to said operating position to define a said channel adjacent said bowl wall.

32. An unscrambler for unscrambling containers comprising:
a bowl having a bowl wall;
a turret situated in the bowl;
a drive system coupled to said turret for rotatably driving said turret;
said drive system also being capable of driving said turret along an axis of rotation from a home position to an operating position;
wherein said turret comprises:
a first planar member;
a second member situated on said first planar member, an outer edge of said second member cooperating with said bowl wall to define a channel having a predetermined depth and width; and
wherein said second member comprises a first portion and a second portion, at least a portion of said second portion remaining in said home position after said drive system drives said first portion to said operating position.

33. The unscrambler as recited in claim 32 wherein said first portion comprises a central floor portion and said second portion comprises a plurality of concentric rings that are actuatable from said home position to said operating position.

34. The unscrambler as recited in claim 33 wherein said unscrambler further comprises:
a ring selection system for selecting at least one of said plurality of concentric rings to be moved between said home position and said operating position.

* * * * *